United States Patent
Kazama et al.

(10) Patent No.: US 7,707,787 B2
(45) Date of Patent: May 4, 2010

(54) DAMPING DEVICE AND METHOD FOR SETTING NATURAL FREQUENCY OF DAMPING BODY IN THE DAMPING DEVICE

(75) Inventors: Mutsuhiro Kazama, Yokohama-shi, Kanagawa (JP); Fumio Sato, Tokyo (JP); Nayomon Uno, Hasuda-shi, Saitama (JP); Masao Mutaguchi, Yotsukaido-shi, Chiba (JP); Yuji Shiga, Yokohama-shi, Kanagawa (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 1648 days.

(21) Appl. No.: 10/498,007

(22) PCT Filed: Feb. 26, 2003

(86) PCT No.: PCT/JP03/02121

§ 371 (c)(1),
(2), (4) Date: Jun. 15, 2004

(87) PCT Pub. No.: WO03/072977

PCT Pub. Date: Sep. 4, 2003

(65) Prior Publication Data

US 2005/0011143 A1    Jan. 20, 2005

(30) Foreign Application Priority Data

Feb. 27, 2002   (JP) .............................. 2002-051209
May 22, 2002   (JP) .............................. 2002-147966
Aug. 30, 2002   (JP) .............................. 2002-253573

(51) Int. Cl.
*E04H 9/00* (2006.01)

(52) U.S. Cl. .................... 52/167.2; 52/167.1; 52/167.4; 52/1

(58) Field of Classification Search ............... 52/167.1, 52/167.2, 167.4, 1
See application file for complete search history.

(56) References Cited

U.S. PATENT DOCUMENTS 5,265,387 A * 11/1993 Ishimaru et al. ............ 52/167.1
5,558,191 A *  9/1996 Lai ........................... 52/167.2
6,966,154 B1 * 11/2005 Bierwirth ................... 52/167.4

FOREIGN PATENT DOCUMENTS

| JP | 153735/1984 | 10/1984 |
| JP | 112353/1987 | 7/1987 |
| JP | 135742/1990 | 11/1990 |
| JP | 3-272343    | 12/1991 |

(Continued)

*Primary Examiner*—Richard E Chilcot, Jr.
*Assistant Examiner*—Elizabeth A Plummer
(74) *Attorney, Agent, or Firm*—Oblon, Spivak, McClelland, Maier & Neustadt, L.L.P.

(57) ABSTRACT

Installed on a top of a structure (1) is a base stand (11) against which damping body (3) movably rests via a linear guide mechanism (12). Mounted between the damping body (3) and the structure (1) or between the damping body (3) and a top of a support housing (14) erected on the structure (1) is a characteristic-frequency adjusting spring or springs (13) with an initial tension being applied vertically. Movement of the damping body (3) causes the spring or springs (13) to be obliquely and longitudinally expanded to apply horizontal component to the damping body (3) upon restoring.

2 Claims, 19 Drawing Sheets

FOREIGN PATENT DOCUMENTS

| | | | |
|---|---|---|---|
| JP | 4-34537 A * | 3/1992 |
| JP | 34537/1992 | 3/1992 |
| JP | 4-157235 | 5/1992 |
| JP | 6-81890 | 3/1994 |
| JP | 6-193678 | 7/1994 |
| JP | 07187349 A * | 7/1995 |
| JP | 10-184789 | 7/1998 |
| JP | 2000-130497 | 5/2000 |
| JP | 2000-186743 | 7/2000 |
| JP | 2001074098 A * | 3/2001 |
| JP | 2003278827 A * | 10/2003 |
| JP | 2004068914 A * | 3/2004 |
| JP | 2006342884 A * | 12/2006 |

* cited by examiner

DISPLACEMENT OF DAMPING BODY (mm)

INITIAL DEFLECTION (mm) OF SPRING

DAMPING DEVICE AND METHOD FOR SETTING NATURAL FREQUENCY OF DAMPING BODY IN THE DAMPING DEVICE

TECHNICAL FIELD

The present invention relates to a damping device installed on a top of a structure such as a towery portion of a suspension bridge, a skyscraper, a tower or a pylon to suppress and early attenuate vibrations or oscillation of the structure due to wind load or earthquake, and further relates to a method for setting a characteristic frequency of a damping body in said damping device.

BACKGROUND ART

In a conventional damping device of this kind, as schematically and exemplarily shown in FIG. 1, guide rails 2 are mounted on a top surface of a structure 1 in parallel with a direction of oscillation of the structure 1, and a damping body or weight 3 rests against the rails 2 via wheels 4 horizontally movably along the rails 2. Interposed between an end face of the damping body 3 and a support frame 5 erected on the structure 1 on its one side in the direction of motion of the damping body 3 are an attenuator or damper 6 for attenuation of kinetic energy of the damping body 3 and a spring 7 for adjusting a characteristic frequency of the damping body 3. When oscillation of the structure 1 occurs, its oscillation energy is transmitted to the damping body 3 so that the damping body 3 is reciprocated on the guide rails 2 with delayed phase of 90° to the oscillation of the structure 1. Then, the kinetic energy of the damping body 3 is attenuated by the attenuator 6 to suppress the oscillation of the structure 1.

However, such damping device has a problem that mass, movement stroke and/or the like of the damping body 3 must be selected to afford an optimum damping effect to the structure 1 and a characteristic frequency of the damping body 3 must be matched with that of the structure 1, which adjustments are much difficult to perform.

More specifically, in the above-mentioned damping device, the characteristic frequency $\omega_0$ of the damping body 3 is given by the equation $$\omega_0 = (k/m)^{1/2}$$

and attenuation coefficient $\mu$ is given by the equation $$M = c/\{2(mk)^{1/2}\}$$

where m is mass of the damping body 3, k is spring constant of the characteristic-frequency adjusting spring 7 and c is an attenuating or controlling force of the attenuator 6 for attenuating the oscillation of the damping body 3. When the characteristic frequency $\omega_0$ of the damping body 3 is to be changed, the spring constant of the spring 7 may be changed from k to $k_1$ to attain change of the characteristic frequency into $\omega_0' = (k_1/m)^{1/2}$. Such change of k into $k_1$ may be performed by changing the force of the spring 7, which in turn may require adjustment of spring displacement. However, the change of the spring constant from k into k.sub.1 is accompanied with change of expansion/contraction stroke of the spring 7, which in turn constrains the motion of the damping body 3, leading to the lowered damping effect. Thus, in particular, the structure 1 with a lower characteristic frequency tends to have mechanical restrictions on the spring 7. For example, when the expansion/contraction stroke of the spring 7 is to be set to 100 mm, generally the spring 7 is required to have length five times as much into 500 mm, leading to a problem of increased two-dimensional space required for installation of the device as a whole.

As a damping device capable of setting a characteristic frequency of a damping body with no mechanical restrictions on spring, there has been proposed, for example, a damping device as schematically shown in FIG. 2 in which a damping body 8 with an arched bottom having radius of curvature R rests against two support rollers 9 arranged in a mutually spaced-apart relationship on a structure 1 so as to allow free oscillation into simple harmonic oscillation, or a damping device as schematically shown in FIG. 3 in which a damping body 10 with a V-shaped bottom of angle $\theta$ as damping mass equivalently analogous to simple pendulum rests against two support rollers 9 on a structure 1 so as to allow free oscillation.

However, these simple-harmonic oscillation type damping devices have a problem that characteristic frequency is hard to adjust after the radius of curvature R of the damping body 8 or the angle $\theta$ of the damping body 10 is once decided.

Moreover, as mentioned above, when the characteristic frequency $\omega_0$ of the damping body 3 is to be changed, such change may be obtained into $\omega_0' = (k_1/m)^{1/2}$ by changing the spring constant of the spring 7 from k to $k_1$. In this respect, since the actual characteristic frequency of the structure 1 is not necessarily as designed, a plurality of springs 7 with different spring constants are needed to be prepared so as to choose one of the springs 7 which has the characteristic frequency corresponding to that of the structure 1; and whenever the characteristic frequency of the damping body 3 is required to be adjusted in response to change in characteristic frequency of the structure 1, the spring 7 must be replaced by that with a corresponding spring constant.

As a damping device capable of both setting and adjusting the characteristic frequency of a damping body irrespective of a spring constant of a spring, there has been proposed a damping device as schematically shown in FIG. 4 in which a damping body 10 with a V-shaped bottom as equivalently analogous to simple pendulum rests via liner plates 10a against two support rollers 9 which in turn are arranged in a mutually spaced-apart relationship on a structure 1 so as to allow free oscillation. In this damping device, adjustment of the characteristic frequency of the damping body 10 requires replacement of the liner plates 10a with those having different thickness, which replacement work is extremely troublesome in that large scale equipment and tools such as hydraulic jacks, lever blocks and/or chain blocks are needed at a site.

Thus, a primary object of the invention is to provide a damping device comprising a damping body adapted for horizontal reciprocal movement and a spring or springs for adjusting a characteristic frequency of the damping body and which allows the motion of the damping body not to be restricted even when spring constant and/or expansion/contraction stroke of the spring or springs is changed.

A second object of the invention is, in a damping device comprising a damping body adapted for horizontal reciprocal movement and a spring or springs for adjusting a characteristic frequency of the damping body, to provide a method for setting the characteristic frequency of the damping body in which the characteristic frequency of the damping body can be readily set and adjusted.

SUMMARY OF THE INVENTION

In order to attain the above-mentioned primary object, according to the invention, a damping body horizontally movably rests against a structure and a characteristic-frequency adjusting spring or springs are mounted between the damping body and the structure such that expansion/contraction force is vertically exerted.

Because of the vertical arrangement of the spring or springs, the or each spring reciprocates about its support point during horizontal movement of the damping body. This reduces a required amount of expansion of the spring or springs and restricts no motion of the damping body. As a result, the characteristic frequency of the damping body can be readily adjusted by changing the spring constant and/or expansion/contraction stroke of the spring or springs.

A passive type device may be provided such that a damping body horizontally movably rests against a structure, and an attenuator for attenuating moving force of the damping body and a characteristic-frequency adjusting spring or springs for exertion of vertical expansion/contraction force are mounted between the damping body and the structure. An active type device may be provided such that a damping body horizontally movably rests against a structure, and an actuator for reciprocation of the damping body and a characteristic-frequency adjusting spring or springs for exertion of vertical expansion/contraction force are mounted between the damping body and the structure.

Instead of the characteristic-frequency adjusting spring or springs for exertion of vertical expansion/contraction force mounted between the damping body and the structure, a characteristic-frequency adjusting spring or springs may be mounted between the damping body and a stationary member erected on the structure to have a position higher than that of the damping body, which also contributes to no restriction to movement of the damping body.

An integral construction may be provided by a plurality of damping units each of which is constituted by a damping body horizontally movably resting against a base stand, an attenuator for attenuation of moving force of the damping body and a characteristic-frequency adjusting spring or springs for exertion of vertical expansion/contraction force, said attenuator and said spring or springs being mounted between the damping body and the base stand, the damping units being piled one above the other on the structure such that their corresponding damping bodies may be moved perpendicular to each other and that the upper damping unit is piled on the lower damping unit on the structure; alternatively, an integral construction may be provided by a plurality of damping units each of which is constituted by a damping body horizontally movably resting against a base stand, an actuator for reciprocation of the damping body and a characteristic-frequency adjusting spring or springs for exertion of vertical expansion/contraction force, said actuator and said spring or springs being mounted between the damping body and the base stand, the damping units being piled one above the other on the structure such that their corresponding damping bodies may be moved perpendicular to each other and that the upper damping unit is piled on the lower damping unit on the structure. Such integral construction can attenuate oscillation of the structure even if the structure may oscillate horizontally in any direction.

Movement of the damping body may be guided by a linear guide mechanism so as to lessen noises during the movement of the damping body.

In order to attain the above-mentioned second object, according to the invention, a resilient structural body or bodies are mounted between a structure and a damping body resting for horizontal reciprocation against the structure such that a vertical tension is exerted, an initial tension of the resilient structural body or bodies being adjusted to set the characteristic frequency of the damping body.

The initial tension of the vertically arranged resilient structural body or bodies themselves is arbitrarily adjustable. Thus, the characteristic frequency of the damping body can be readily set.

The or each resilient structural body may comprise a spring and a connecting rod variably adjustable in length, the initial tension being adjusted by changing the length of the connecting rod; alternatively, the or each resilient structural body may comprise a spring and a connecting rod which is connected at its end away from the spring to a support plate which in turn is lapped over and pivotally connected to a bracket secured to the damping body or to the structure, the initial tension being adjusted by varying a position of connection between the support plate and the bracket. Thus, the characteristic frequency of the damping body can be set to an optimum value matched with the characteristic frequency of the structure.

BRIEF DESCRIPTION OF DRAWINGS

FIG. 5 shows a fundamental construction of a damping device according to the invention in which FIG. 5a is a schematic side view and FIG. 5b is a view looking in the direction of arrows A in FIG. 5a;

FIG. 6 shows a modification of the fundamental construction of FIGS. 5a and 5b in which FIG. 6a is a schematic side view and FIG. 6b is a view looking in the direction of arrows B in FIG. 6a;

FIG. 7 shows an embodiment of a damping device according to the invention in which

FIG. 8 shows another embodiment of the damping device according to the invention in which FIG. 8a is a side view partly in section and FIG. 8b is a view looking in the direction of arrows C in FIG. 8a;

FIG. 16 shows a conventional active-type biaxial damping device in which

FIG. 17 shows embodiments on other adjustment modes of characteristic-frequency adjusting spring in which

FIG. 18 shows other embodiments of characteristic-frequency adjusting spring in which

BEST MODE FOR CARRYING OUT THE INVENTION

Embodiments of the invention will be described in conjunction with the drawings.

First, an embodiment of a damping device according to the invention will be described.

Figure 5A:
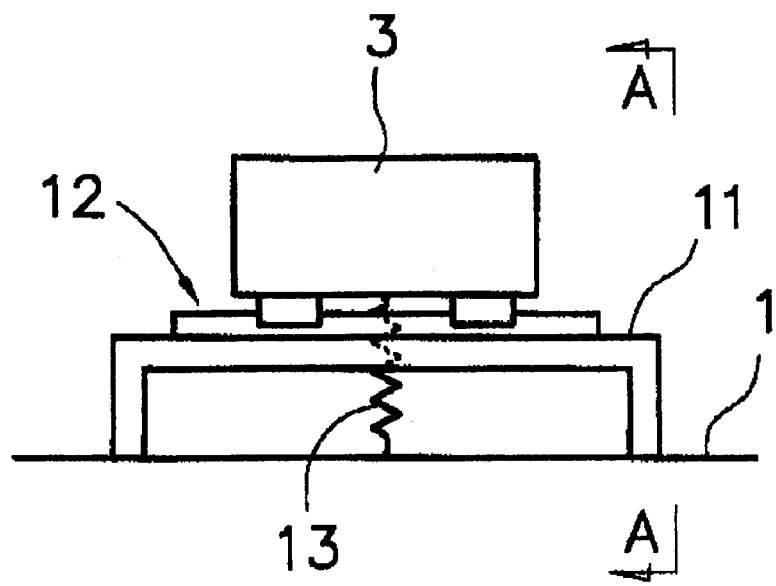
Figure 5B:
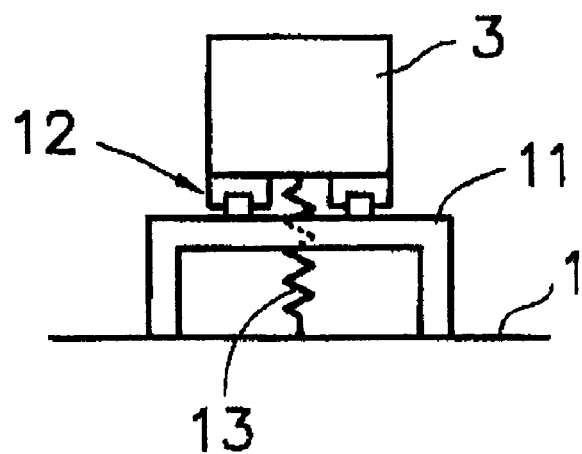
Figure 6A:
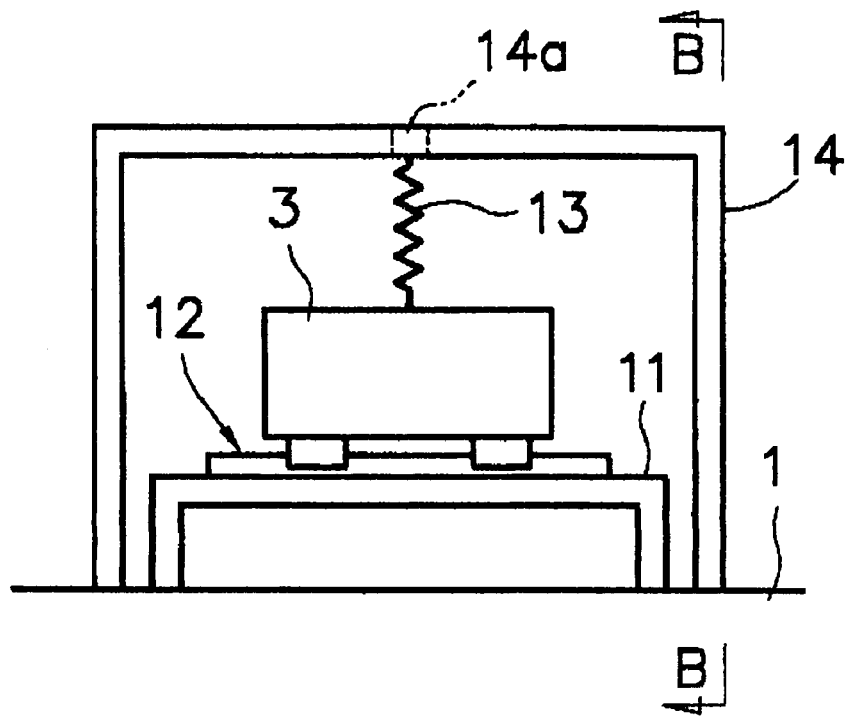
Figure 6B:
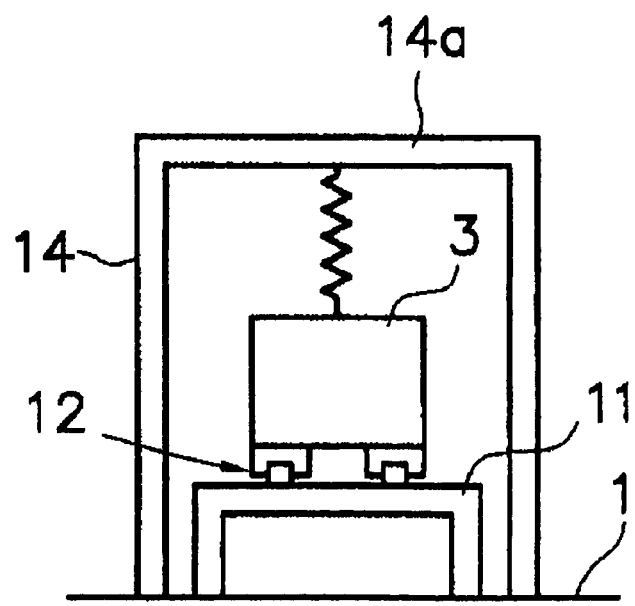

FIGS. 5a and 5b show a fundamental construction of the invention. Installed on a top surface of a structure 1 is a base stand 11 against which a damping body or weight 3 horizontally movably rests via a guide mechanism such as a linear guide mechanism 12 along a direction of oscillation of the structure 1. A characteristic-frequency adjusting spring 13, which is a so-called helical extension spring, is mounted vertically between, for example, a lower center surface of the damping body 3 in its neutral position, i.e., at a longitudinally intermediate position of the guide mechanism and the structure 1 just therebelow such that spring constant and/or expansion/contraction stroke of the spring can be adjusted; alternatively, as shown in FIGS. 6a and 6b and instead of arranging the spring 13 between the lower center surface of the damping body 3 and the top of the structure 1 of FIGS. 5a and 5b, the base stand 11 and the damping body 3 are surrounded by a support housing 14 as a stationary member and a spring 13 is vertically mounted between, for example, a top center surface of the damping body 3 and an upper beam 14a of the support housing 14 so as to suspend the damping body 3 from above.

Figure 7A:
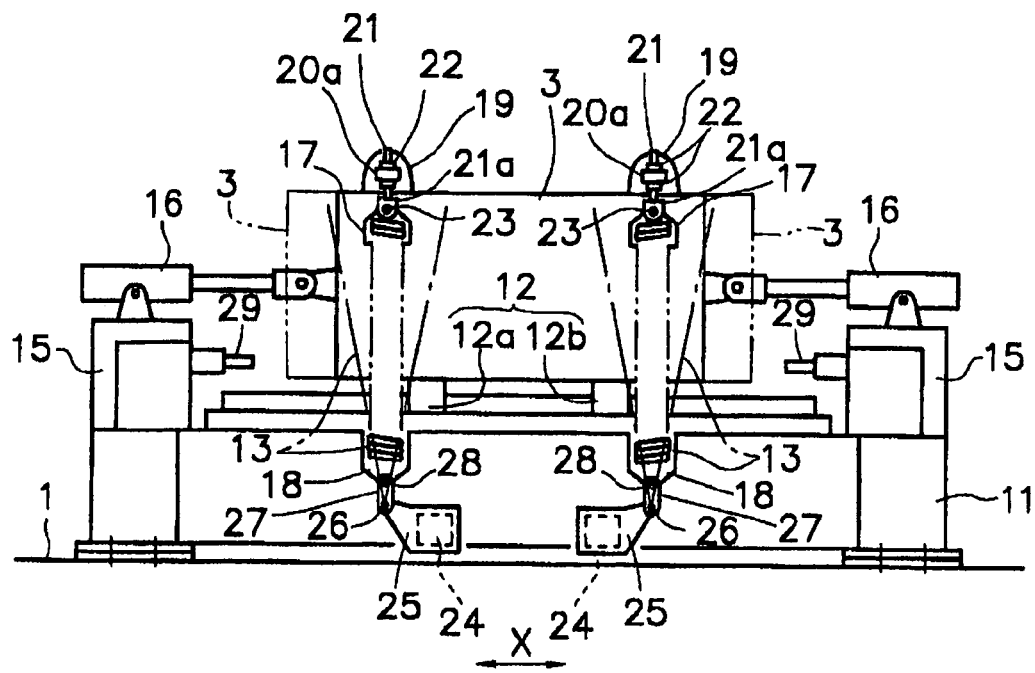
FIGS. 7a and 7b are side and plan views, respectively.
Figure 7B:
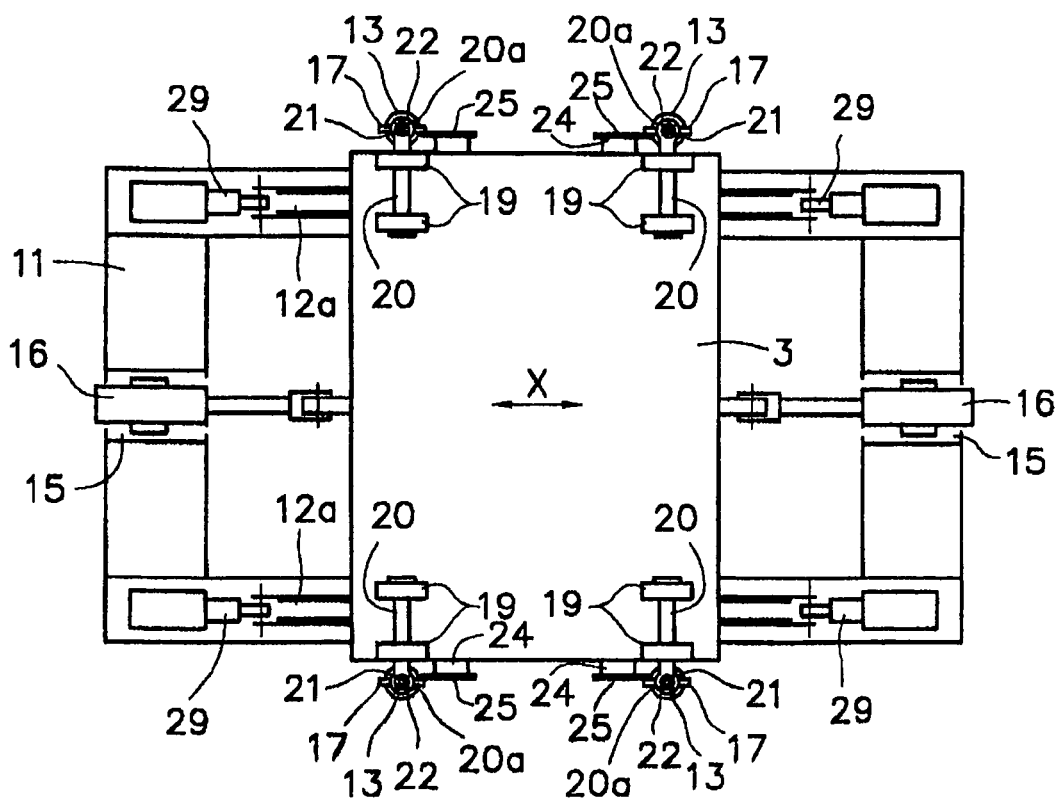

FIGS. 7a and 7b show an embodiment of the invention based on the fundamental construction shown in FIGS. 5a and 5b and directed to a passive type. More specifically, installed on a top surface of a structure 1 is a base stand 11 in the form of a rectangular frame. Arranged on laterally opposite sides of the base stand 11 and along a longitudinal direction or direction of oscillation (direction of arrow X) of the structure 1 are linear guide rails 12a in parallel with each other against which a damping body or weight 3 longitudinally movably rests via linear blocks 12b. Thus, a liner guide mechanism 12 is provided by the linear guide rails 12a and the linear blocks 12b. Attenuators 16 such as oil dampers are horizontally interposed between support stands 15 fixed to lateral centers of forward and backward ends of the base stand 11 and forward and backward ends in the direction of motion of the damping body 3, respectively. Furthermore, mounted between opposite lateral sides of the forward and backward ends of the damping body 3 and corresponding lateral opposite sides of lower portion of the base stand 11, respectively, are characteristic-frequency adjusting springs 13 for adjustment of the characteristic frequency of the damping body 3 such that they are vertical at longitudinally neutral positions of the damping body 3.

Each of the springs 13 is fixed at its upper and lower ends to and supported by plate-like upper and lower holders 17 and 18, respectively. On each of laterally opposite sides of the forward and backward ends of the damping body 3 where upper ends of the springs 13 are mounted, two brackets 19 are fixed in a laterally spaced-apart relationship. At each of these four positions on the damping body 3, a rod 20 with an eye 20a at its tip extends through the paired brackets 19 such that the eye 20a laterally protrudes from the damping body 3 by a predetermined extent. Extends through the eye 20a of each of the rods 20 and vertically displaceably fixed by nuts 22 is a bolt 21 having at its lower end a crevice 21a to which the upper holder 17 for the spring 13 is connected through a pin 23. At each of positions on laterally opposite sides of the base stand 11 and forwardly and backwardly away from a longitudinal center of the base stand 11 by a required extent where the lower ends of the springs 13 are mounted, a support beam 24 laterally extends through the base stand 11 and protrudes from the lateral side of the base stand 11 by a required extent. Mounted to each of the protruding ends of the support beams 24 is a bracket 25 which extends longitudinally of the damping body. Each of the brackets 25 has a tip end to which a link member 27 is connected at its lower end through a pin 26. The link member 27 has an upper end to which the lower holder 18 for the spring 13 is connected at its lower end through a bolt 28.

In FIGS. 7a and 7b, reference numeral 29 denotes stoppers arranged on four corners of the base stand 11 in longitudinally opposed relationship so as to confine the longitudinal motion of the damping body 3.

Upon installation of the thus constructed damping device on the top surface of the structure 1, initial expansion/contraction force is imparted to each of the springs 13 to make the characteristic frequency of the damping body 3 matched with that of the structure 1. In this case, the vertical position of the bolt 21 connected to each of the springs 13 near the upper holders 17 is adjusted by screwing the nuts 22 to select the force of the spring 13 to thereby set the spring constant and/or expansion/contraction stroke to desired value.

Figure 1:
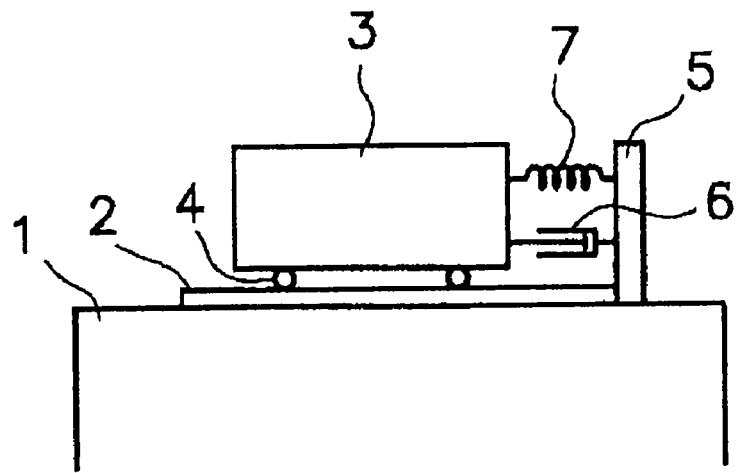
FIG. 1 is a schematic diagram showing a conventional damping device.
Figure 2:
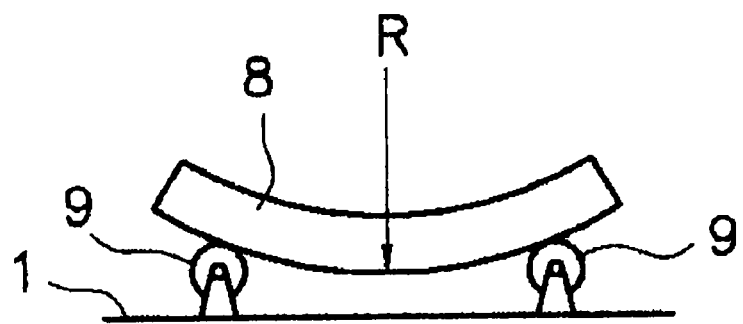
FIG. 2 is a schematic diagram showing another conventional damping device.
Figure 3:
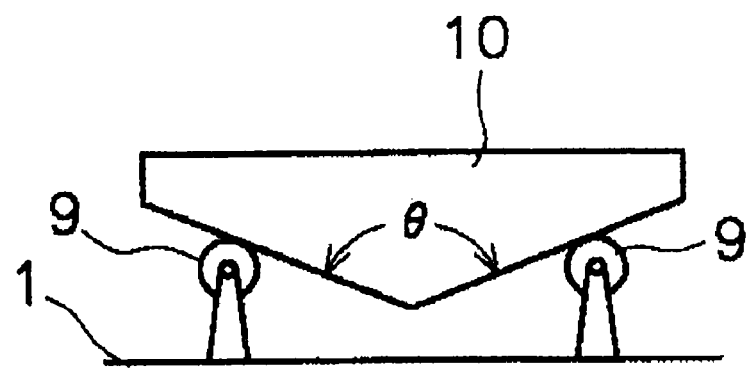
FIG. 3 is a schematic diagram showing a further conventional damping device.
Figure 4:
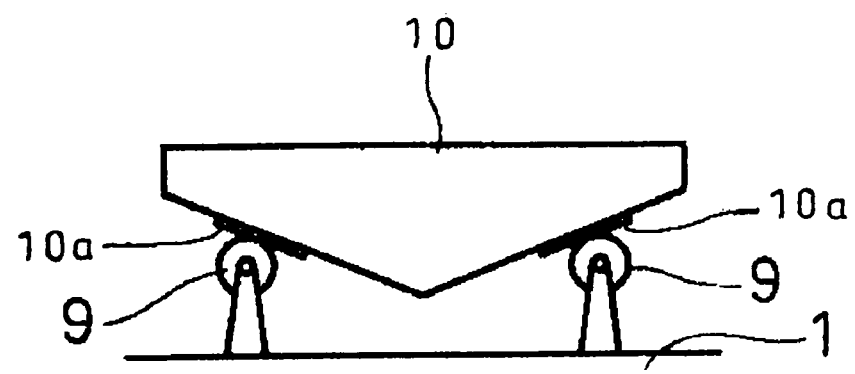
FIG. 4 is a schematic diagram showing a still further conventional damping device.

In the state mentioned above, when oscillation of the structure 1 occurs by means of, for example, aerodynamic force, its oscillation energy is transmitted to the damping body 3 and is converted to kinetic energy with which the damping body 3 is horizontally moved, which energy is consumed by the attenuators 16. By such kind of indirect energy consumption, the oscillation of the structure 1 is promptly suppressed. In this case, the damping force to the structure 1 is obtained optimum by selecting the mass, the movement stroke and/or the characteristic frequency of the damping body 3. Since the characteristic-frequency adjusting springs 13 are vertically mounted between the damping body 3 and the base stand 11, horizontal movement of the damping body 3 as shown in two-dot chain lines in FIG. 7a causes the springs 13 to reciprocate about the pins 26 near the lower holders 18 as shown in one-dot chain lines in accordance with the movement of the damping body 3 so that the springs 13 are expanded obliquely forwardly and backwardly to apply horizontal components to the damping body 3 when they restore to their original state. Thus, each of the springs 13 has a little amount of expansion in comparison with the horizontal expansion/contraction of the springs 7 in the conventional device shown in FIG. 1 and does not restrict the motion of the damping body 3. As a result, with the characteristic frequency of the damping body 3 being adjusted by the springs 13 or with the restoring force of the springs 13 being adjusted, the damping body 3 can be afforded to have a great movement stroke. Thus, even in the case of the structure 1 with a lower characteristic frequency, the characteristic frequency of the damping body 3 can be readily matched to the same.

In the above, the linear guide mechanisms 12 for guiding the horizontal movement of the damping body 3 may set minimum the gaps between the linear guide rails 12*a* and the linear blocks 12*b* so that no loose is generated upon reciprocal movement of the damping body 3, leading to lessening of noises generated. In the embodiment, four springs 13 are used; such use of a plurality of springs 13 advantageously contributes to applicability for a damping body 3 with a larger mass.

Figure 8A:
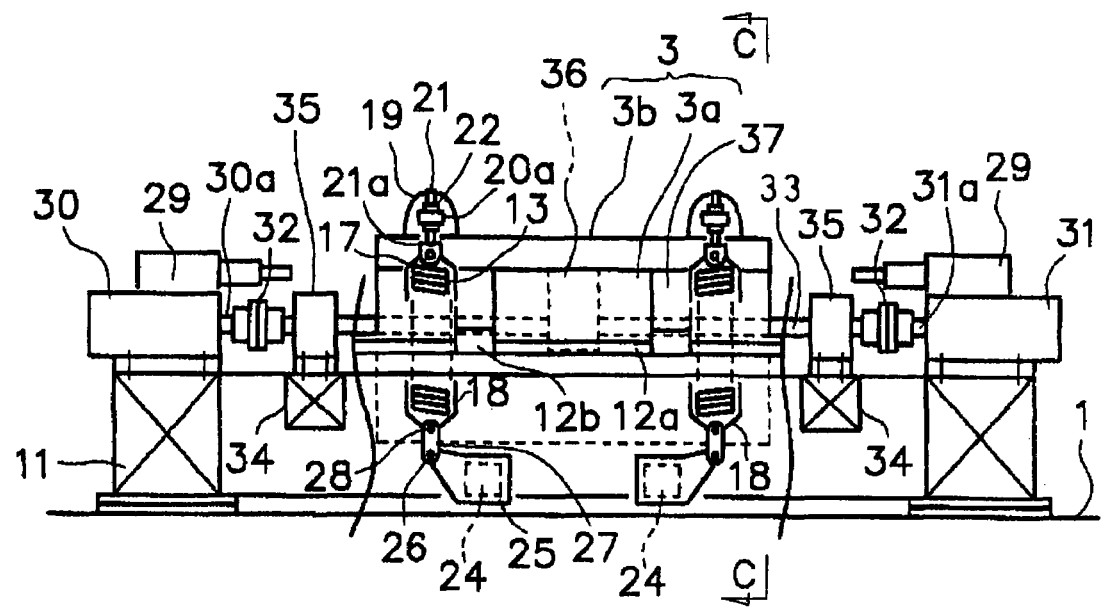
Figure 8B:
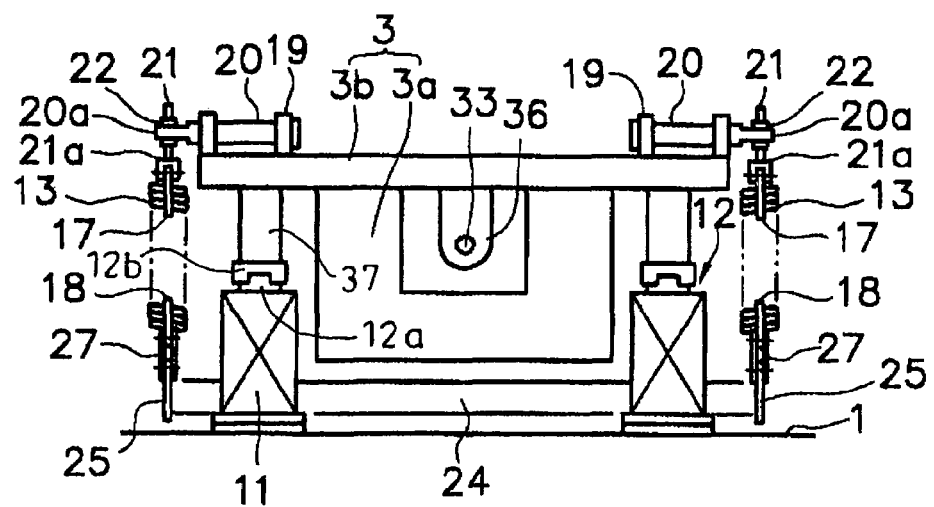

FIGS. 8*a* and 8*b* show a further embodiment of the invention directed to active type. More specifically, in a structure similar to that shown in FIGS. 7*a* and 7*b* and instead of the attenuators 16 mounted between the damping body 3 and the base stand 11, a motor 30 as an actuator and an attenuator 31 in the form of a mechanical damper such as rotary torque, rotary hydraulic or eddy damper are arranged laterally centrally at opposite longitudinal ends of the base stand 11, respectively. A ball screw 33 is arranged and connected between an output shaft 30*a* of the motor 30 and an input shaft 31*a* of the attenuator 31 via joints 32. The ball screw 33 is rotatably supported at its opposite ends by bearings 35 on laterally extending auxiliary beams 34 of the base stand 11 and is threaded through a nut 36 fixed to the damping body 3. Thus, the motor 30 is driven to rotate the ball screw 33 so that the damping body 3 is moved in unison with the nut 36.

In this embodiment, in order to reduce the overall height of the device, the damping body 3 is provided by a damping body main 3*a* made from lead with concave section to have a through groove at its top in the direction of movement and a flat base plate 3*b* made of stainless steel and having a bottom to which the damping body main 3*a* is mounted. The nut 36 is mounted centrally on the bottom of the base plate 3*b* and is designed such that the engaged position of the nut 36 with the ball screw 33 is a center of gravity of the damping body 3. With the damping body 3 being thus constructed, the linear blocks 12*b* to be engaged with the linear guide rails 12*a* are mounted to the lower surface of the base plate 3*b* via mount members 37 and the springs 13 are used which are shorter in length than those shown in FIGS. 7*a* and 7*b*. The remaining constructions are the same as those shown in FIGS. 7*a* and 7*b*; the same parts are designated by the same reference numerals.

In the embodiment of FIGS. 8*a* and 8*b*, when oscillation of the structure 1 occurs and is detected by an oscillation detection sensor (not shown), a displacement signal phase-controlled on the basis of a detection signal from the sensor is transmitted from a control unit (not shown) to the motor 30 so that the motor 30 is driven in forward or reverse direction. As a result, in unison with the nut 36 engaged over the ball screw 33 rotatably driven by the motor 30, the damping body 3 is longitudinally reciprocated; the kinetic energy of this damping body 3 is consumed by the attenuator 31 so that oscillation of the structure 1 can be promptly suppressed. Then, as is the case of FIGS. 7*a* and 7*b*, the springs 13 are obliquely and longitudinally expanded and apply horizontal components to the damping body 3 upon restoring so that the damping body 3 can be stably reciprocated in tune with the characteristic frequency of the structure 1.

In the above, the restoring force due to the expansion/contraction of the spring 13 can be added to the returning force for the damping body 3 at its reciprocal movement, so that the drive force of the motor 30 as an actuator can be reduced. Even in case supply of electric power to the motor 30 is stopped due to, for example, power failure and the motor 30 fails to make active damping, oscillation of the structure 1 can be suppressed through passive type damping or indirect energy consumption such that, because of the attenuator 31 arranged coaxially of the motor 30, the motor 30 is made free to change the energy of oscillation generated in the structure 1 into horizontal kinetic energy of the damping body 3 which is changed through the nut 36 into rotational energy for the ball screw 33 which in turn is consumed by the attenuator 31. When an eddy damper is used as the attenuator 31, electric current for the eddy damper may be adjusted to make variable the damping characteristic of the attenuator 31.

Figure 9:
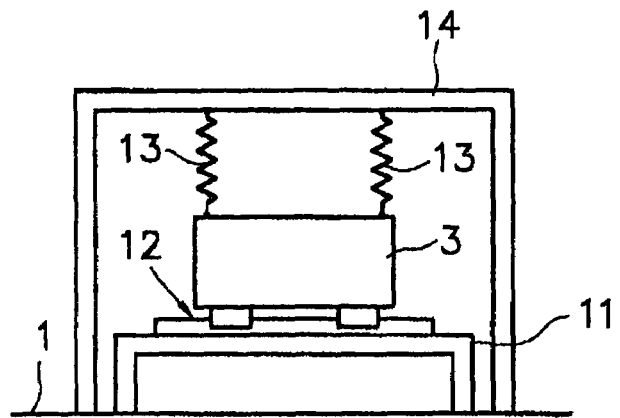
FIG. 9 is a schematic diagram showing a modification of the embodiment of the damping device shown in FIGS. 7 and 8.
Figure 10:
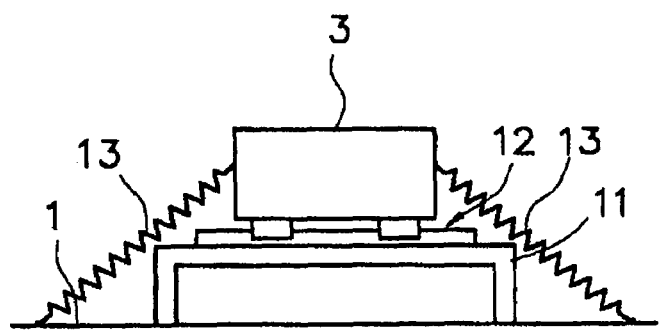
FIG. 10 is a schematic diagram showing a further embodiment of the damping device according to the invention.
Figure 11:
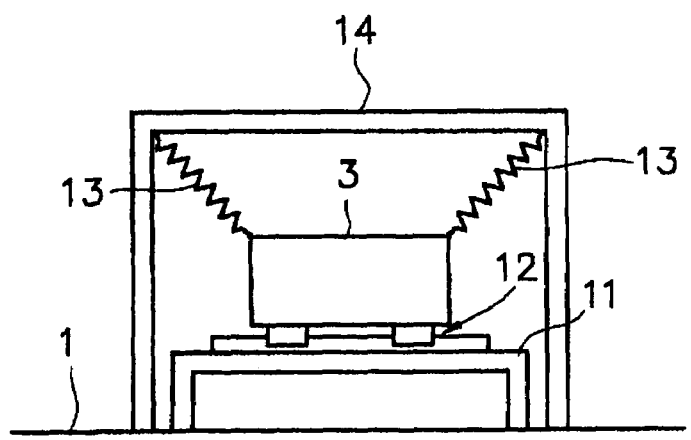
FIG. 11 is a schematic diagram showing a modification of the embodiment shown in FIG. 10.

In the above-mentioned embodiments shown in FIGS. 7*a* and 7*b* and FIGS. 8*a* and 8*b*, in order to make relatively massive damping body 3 available, totally four springs 13 are arranged between the laterally opposite sides of the forward and rearward ends of the damping body 3 and the base stand 11. As a modification thereof and as shown in FIG. 9, a support housing 14 just like that shown in FIGS. 6*a* and 6*b* may be used for suspension from above. Alternatively, as a further embodiment of the invention, between the forward and backward ends of the damping body 3 and the structure 1 as shown in FIG. 10 or between the forward and backward ends of the damping body 3 and the support housing 14 as shown in FIG. 11, each one or more forward and rearward springs 13 may be arranged slantingly for antagonism (or symmetry) between forward and backward sides.

Figure 12:
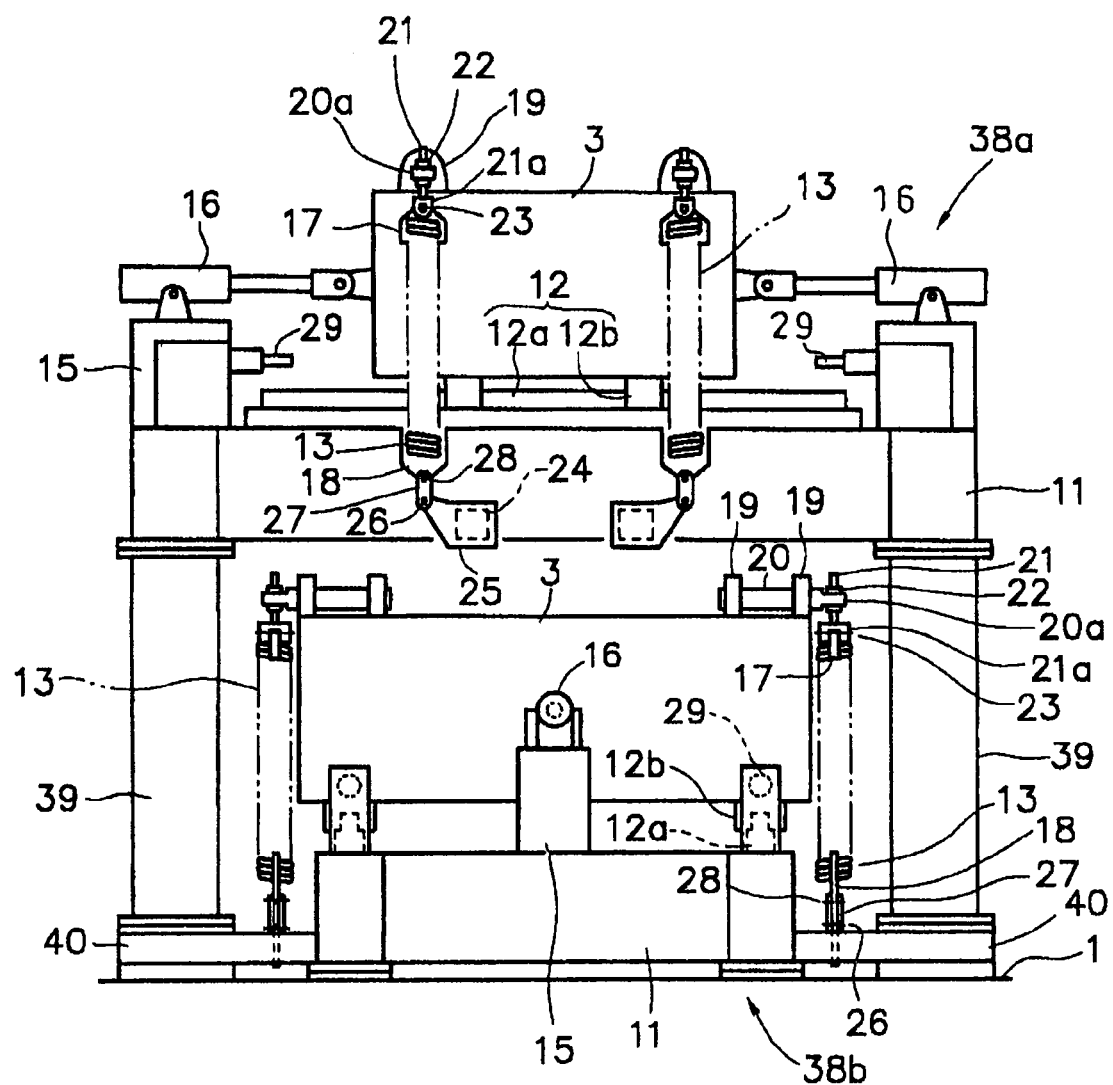
FIG. 12 is a schematic side view showing a still further embodiment of the damping device according to the invention.
Figure 13:
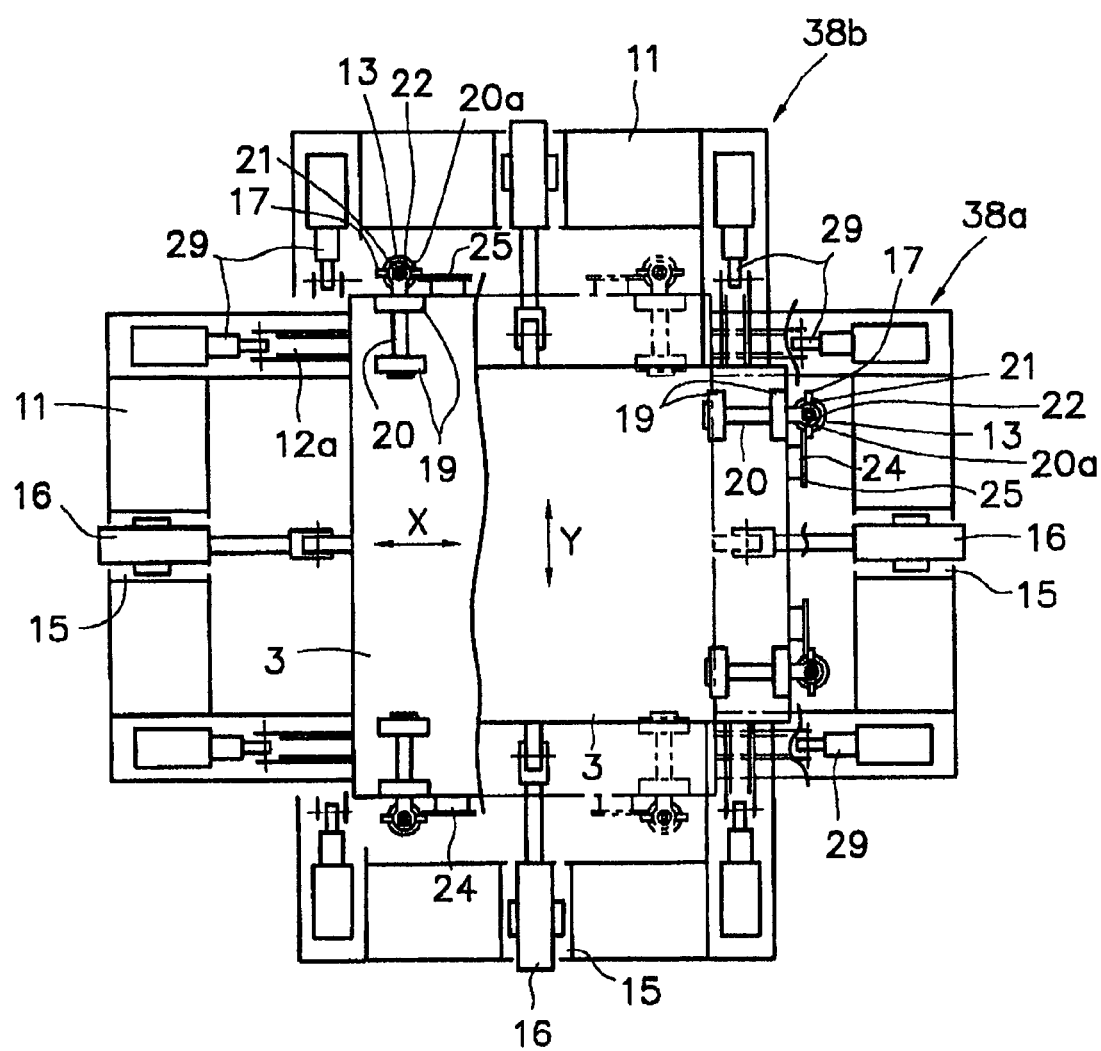
FIG. 13 is a schematic plan view partly in section of FIG. 12.

FIGS. 12 and 13 show a still further embodiment of the invention which comprises two separate damping units 38*a* and 38*b* each of which comprises, just like that shown in FIGS. 7*a* and 7*b*, a base stand 11 in the form of rectangular frame, a linear guide mechanism 12 comprising a pair of linear guide rails 12*a* on laterally opposite sides on the base stand 11 and longitudinally in parallel with each other and linear blocks 12*b* each slidably arranged on the linear guide rails 12*a*, a damping body 3 longitudinally movably resting via the linear guide mechanism 12 against the base stand 11, characteristic-frequency adjusting springs 13 for the damping body 3 vertically arranged between the laterally opposite sides of the forward and backward ends of the damping body 3 and corresponding laterally opposite sides of a lower portion of the base stand 11, and attenuators 16 for attenuating relative oscillation of the damping body 3 to the base stand 11. The two damping units 38*a* and 38*b* are vertically piled one above the other such that their corresponding damping bodies 3 may have directions of movement perpendicular to each other. Interposed between lower surfaces on the four corners of the base stand 11 of the upper damping unit 38*a* and upper surfaces on the extensions 40 laterally protruded from the base stand 11 of the lower damping unit 38*b* are leg members 39 each of which has length slightly longer than the height of the lower damping unit 38*b*, the upper damping unit 38*a* being integrally arranged on the lower damping unit 38*b*.

In the other respects, the parts same as those shown in FIGS. 7*a* and 7*b* are designated by the same reference numerals.

In use of the damping device according to the embodiment shown in FIGS. 12 and 13, the damping units 38*a* and 38*b* are arranged on the structure 1 such that the damping bodies 3 of the damping units 38a and 38b have directions of movement in line with directions of two axes (X direction and Y direction perpendicular to the X direction on a plane) along which the structure 1 tends to mainly oscillate. FIG. 13 shows a case where the damping bodies 3 on the upper and lower damping units 38a and 38b are arranged to move in the X and Y directions, respectively.

In the state mentioned above, when oscillation of the structure 1 occurs in the X direction due to, for example, aerodynamic force, its oscillation energy is transmitted to the damping body 3 of the upper damping unit 38a and transformed into kinetic energy with which said damping body 3 is moved in the X direction. This kinetic energy is consumed by the attenuators 16 of the upper damping unit 38a to promptly suppress the oscillation of the structure 1 in the X direction.

On the other hand, when oscillation of the structure occurs in the Y direction, its oscillation energy is transmitted to the damping body 3 of the lower damping unit 38b and transformed into kinetic energy with which said damping body 3 is moved in the Y direction. This kinetic energy is consumed by the attenuators 16 of the lower damping unit 38b to promptly suppress the oscillation of the structure 1 in the Y direction.

Further, when oscillation of the structure 1 occurs in mixed X and Y direction components, the X direction component in its oscillation energy is converted in the upper damping unit 38a into the kinetic energy of the damping body 3 by the action just like the above which can be consumed by the attenuators 16; the Y direction component is converted in the lower damping unit 38b into the kinetic energy of the damping body 3 which can be consumed by the attenuators 16. Thus, oscillation in any direction in the structure 1 can be promptly suppressed. Thus, even oscillation of a structure 1 with round or square section and having no prevailing oscillating directions can be suppressed to ensure living comfortability in the structure 1.

The respective damping units 38a and 38b, which have the separate damping bodies 3, can be independently and arbitrarily set as to masses and/or characteristic frequencies of the damping bodies 3, which fact make it facilitate to respond to cases where parameters such as amplitude and frequency differ with respect to two axle directions at which oscillation occurs in each of the structures 1 whose oscillation is to be suppressed.

Figure 14:
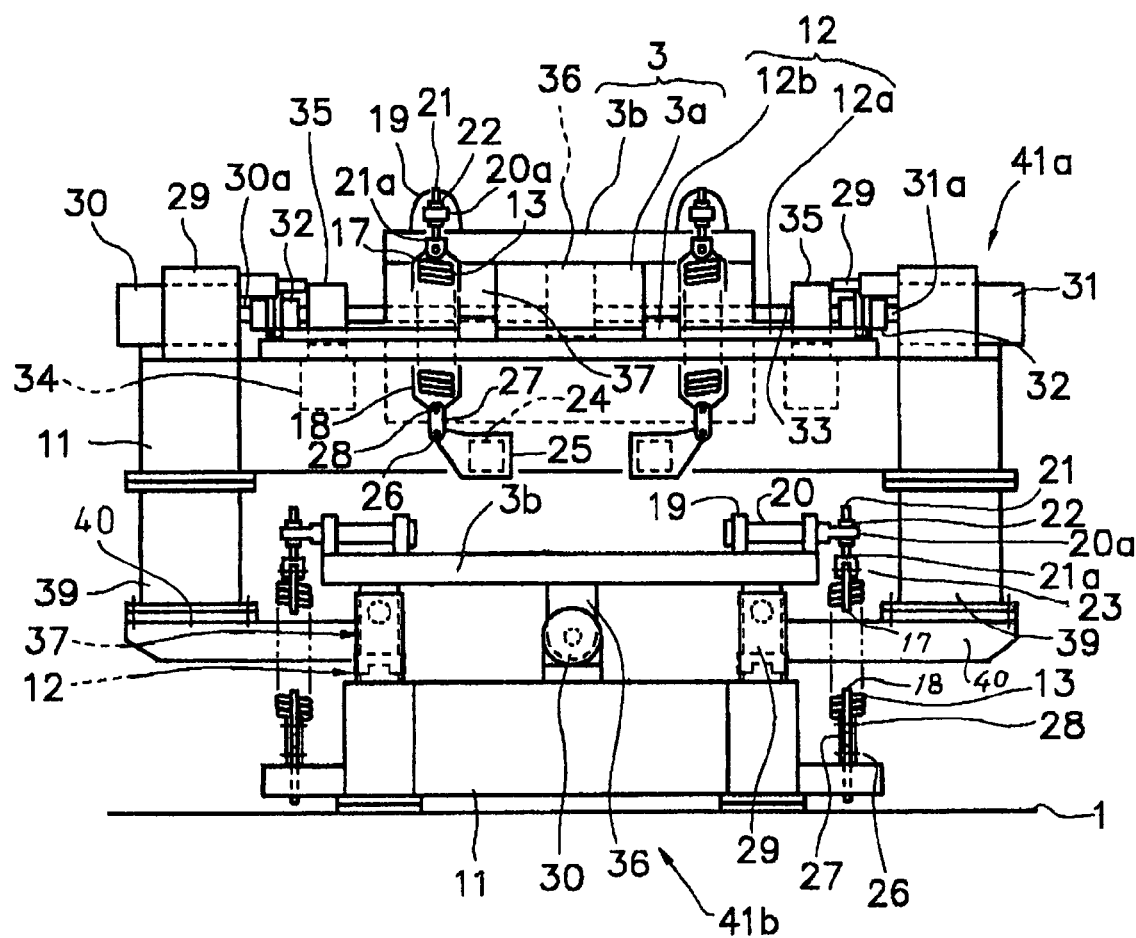
FIG. 14 is a schematic side view showing a still further embodiment of the damping device according to the invention.
Figure 15:
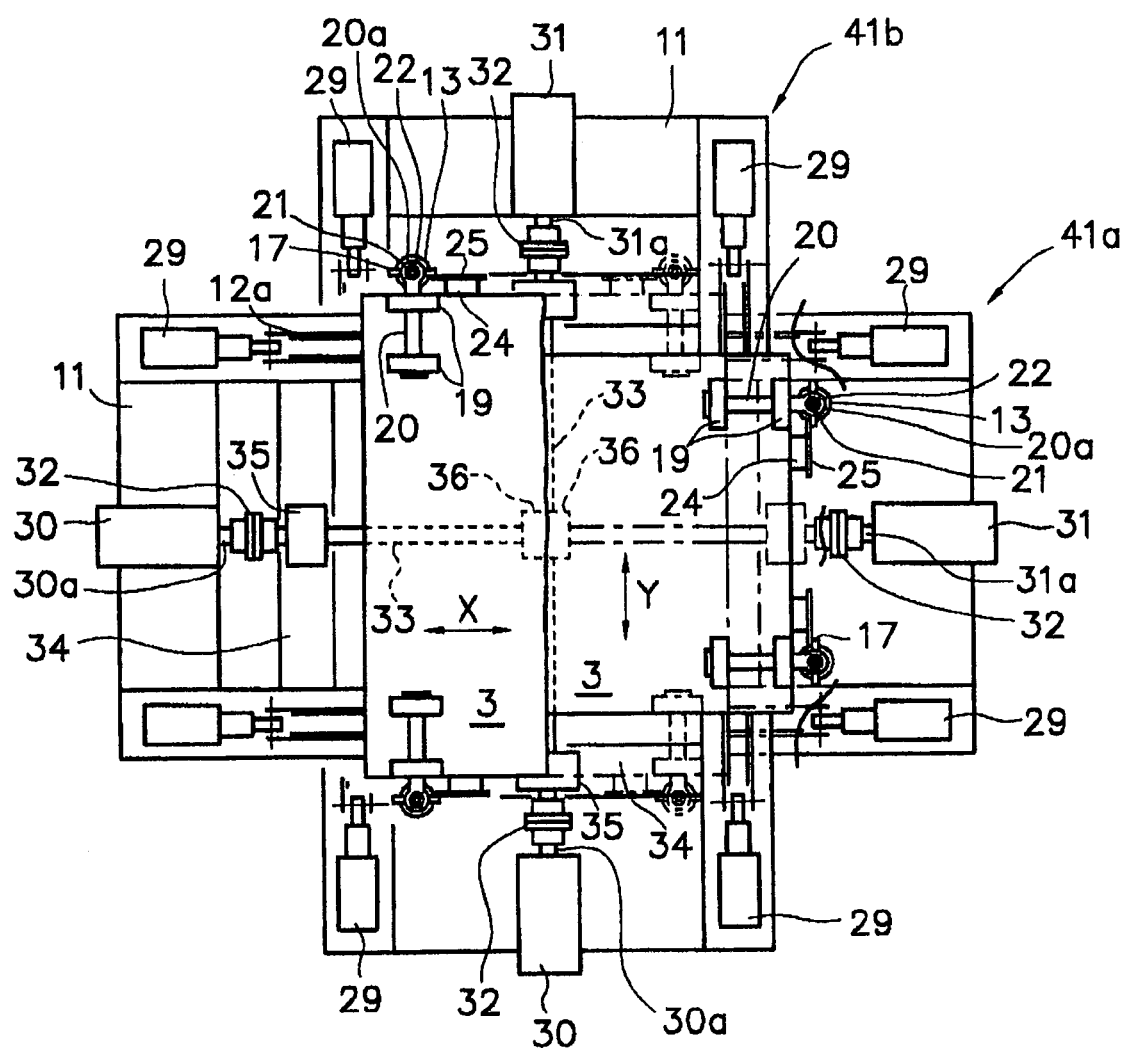
FIG. 15 is a schematic plan view partly in section of FIG. 14.

FIGS. 14 and 15 show a still further embodiment of the invention in which a two axle type damping device similar to that shown in FIGS. 12 and 13 is made active-type. The damping device of this embodiment have separately formed upper and lower damping units 41a and 41b.

The upper damping unit 41a comprises a base stand 11 in the form of a rectangular frame, a linear guide mechanism 12 comprising a pair of linear guide rails 12a arranged on laterally opposite sides on the base stand 11 and longitudinally in parallel with each other and linear blocks 12b slidably mounted on the linear guide rails 12a, a damping body 3 longitudinally movably resting via the linear guide mechanism 12 against the base stand 11, characteristic-frequency adjusting springs 13 for the damping body 3 and vertically mounted between laterally opposite sides of the forward and backward ends of the damping body 3 and corresponding laterally opposite sides of the base stand 11, a motor 30 as an actuator and an attenuator 31 in the form of a mechanical damper such as rotary torque, rotary hydraulic or eddy damper which are oppositely arranged on lateral centers on one and the other longitudinal ends of the base stand 11, a ball screw 33 connected through joints 32 to and between an output shaft 30a of the motor 30 and an input shaft 31a of the attenuator 31 and a nut 36 fixed to the damping body 3 and through which the ball screw 33 is threadedly passed at the center of gravity of the damping body 3.

The lower damping unit 41b is substantially the same in structure as the upper damping unit 41a except that there is no damping body main 3a of the damping body 3 and only a base plate 3b is provided. Thus, the upper and lower damping units 41a and 41b are arranged one above the other such that the axial ball screws 33 are directed perpendicular to each other; the leg members 39 are interposed between lower surfaces on the four corners of the base stand 11 of the upper damping unit 41a and upper surfaces on the extensions 40 laterally protruded from the base stand 11 of the lower damping unit 41b. The upper damping unit 41a is integrally arranged on the lower damping unit 41b and serves as a damping body for the lower damping unit 41b.

In the other respects, the parts same as those shown in FIGS. 8(a) and 8(b) are designated by the same reference numerals.

In use of the damping device of FIGS. 14 and 15, just like the damping device in the embodiment shown in FIGS. 12 and 13, the damping units 41a and 41b are installed on the structure 1 such that the upper damping unit 41a and the base plate 3b of the lower damping unit 41b have directions of movement in line with directions of two axes (X direction and Y direction perpendicular to the X direction on a plane) along which the structure 1 tends to mainly oscillate. FIG. 15 shows a case where the upper damping unit 41a and the base plate 3b of the lower damping unit 41b are arranged to move in the X and Y directions, respectively.

In the state mentioned above, when oscillation of the structure 1 occurs in the X direction due to, for example, aerodynamic force and its oscillation is sensed by an oscillation detection sensor (not shown), a displacement signal phase-controlled on the basis of a detection signal therefrom is transmitted from a control unit (not shown) to the motor 30 of the upper damping unit 41a. As a result, the upper damping unit 41a is operated like the damping device of the embodiment shown in FIGS. 8(a) and 8(b) with respect to the oscillation of the structure 1 in the X direction, so that the oscillation of the structure 1 in the X direction can be promptly suppressed.

On the other hand, when oscillation of the structure 1 occurs in the Y direction and its oscillation is sensed by an oscillation detection sensor (not shown) just like the above, a displacement signal phase-controlled on the basis of a detection signal from the sensor is transmitted from the control unit (not shown) to the motor 30 of the lower damping unit 41b. As a result, the upper damping unit 41a is operated, as the damping body for the lower damping unit 41b, just like the damping device of the embodiment shown in FIGS. 8(a) and 8(b) with respect to the oscillation in the Y direction of the structure 1, so that oscillation of the structure 1 in the Y direction can be promptly suppressed.

Further, when oscillation of the structure 1 occurs in mixed X and Y direction components, the X direction component in its oscillation can be, just like the above, promptly suppressed by the upper damping unit 41a; and the Y direction component can be promptly suppressed by the upper damping unit 41a which also serves as damping body of the lower damping unit 41b. As a result, oscillation in any directions in the structure 1 can be promptly suppressed. Thus, even oscillation of a structure 1 with round or square section and having no prevailing oscillating directions can be suppressed.

Even when electricity supply to the motors 30 in the above-mentioned damping units 41a and 41b is stopped, the respective damping units 41a and 41b have attenuators 31 so that, as in the case of the embodiment shown in FIGS. 8(a) and 8(b), passive type damping may be effected.

Since the upper damping unit 41a has the damping body 3 and can serve as damping body of the lower damping unit 41b, the respective damping units 41a and 41b can be independently and arbitrarily set as to masses and/or characteristic frequencies of the damping body 3 and of the upper damping unit 41a as damping body. As a result, facilitated is response to cases where parameters such as amplitude and frequency differ with respect to two axle directions at which oscillation occurs in each of the structures 1 whose oscillation is to be suppressed.

Figure 16A:
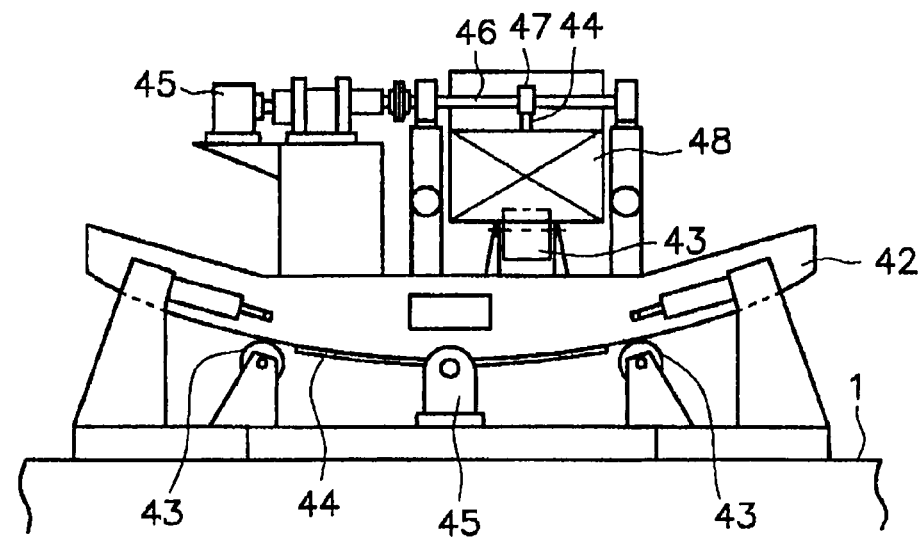
FIGS. 16a and 16b are schematic side and front views, respectively.
Figure 16B:
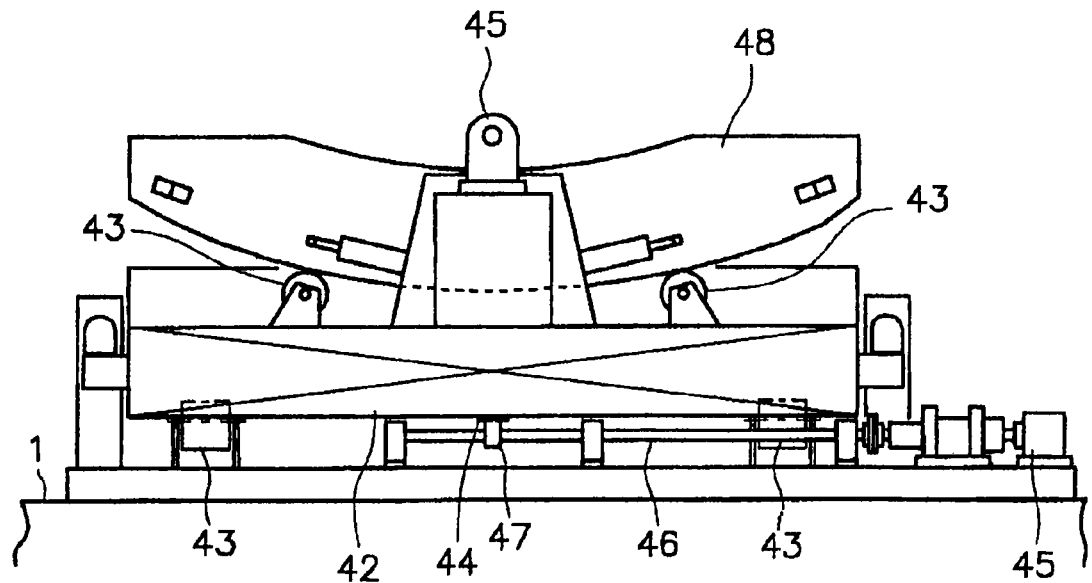

In a conventional damping device shown in FIGS. 16a and 16b, a damping body or weight 42 with an arched bottom having a required radius of curvature rests against support rollers 43 arranged in mutually spaced-apart relationship on a structure 1 so as to allow free oscillation into simple harmonic oscillation. An arched rack 44 mounted on the damping body 42 along the direction of oscillation is meshed with a pinion 47 on a rotary shaft 46 connected to an output shaft of a motor 45. A further damping body or weight 48 with an arched bottom having a required radius of curvature is supported via support rollers 43 on said damping body 42 such that directions of oscillation of the damping bodies are perpendicular to each other for simple harmonic oscillation at the support rollers 43. An arched rack 44 mounted on the upper damping body 48 along the direction of oscillation is meshed with a pinion 47 on a rotary shaft 46 connected to an output shaft of a motor 45 installed on the lower damping body 42. The respective motors 45 reciprocally drive the upper and lower damping bodies 42 and 48 respectively at required cycles independently from each other for biaxial damping of the structure 1. Such conventional, active-type biaxial damping device requires a cable bear (not shown) or the like for mobile wiring for supply of electric power to the motor 45 for reciprocation of the upper damping body 48 reciprocated in unison with the lower damping body 42. However, in the case of FIGS. 12 and 13, such mobile wiring becomes unnecessary.

Figure 17A:
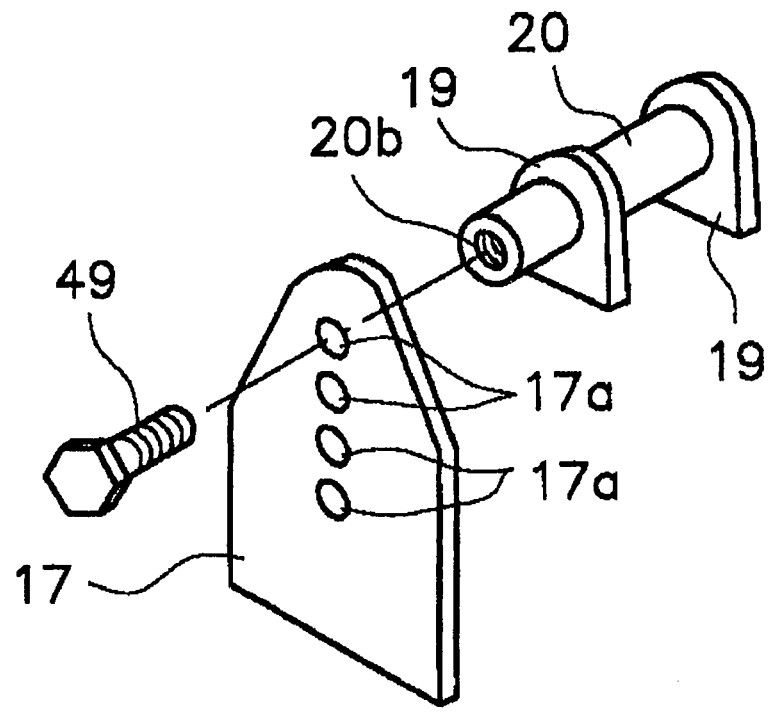
FIGS. 17a and 17b are schematic views on different structures.
Figure 17B:
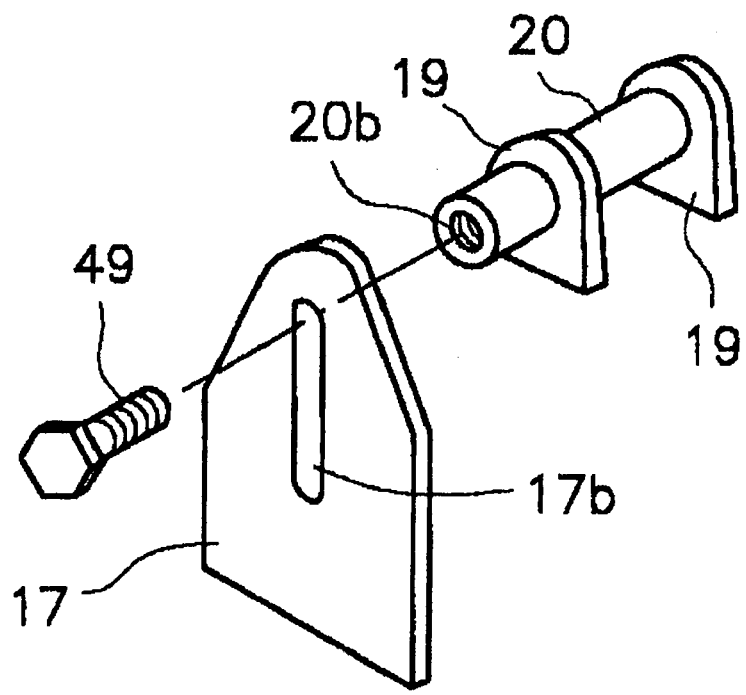
Figure 18A:
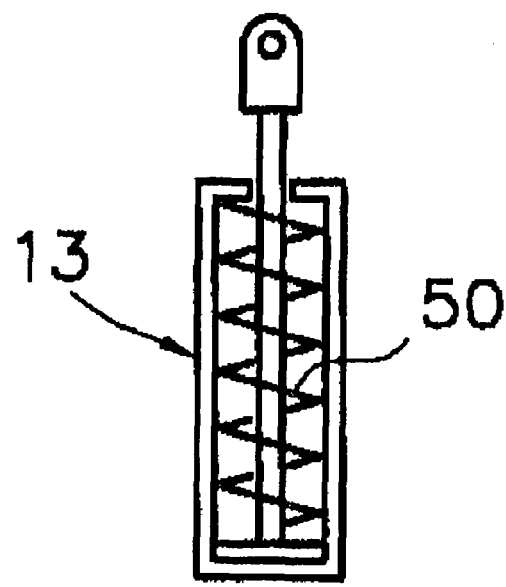
FIGS. 18a and 18b are views using a helical compression spring and a coned disc spring, respectively.
Figure 18B:
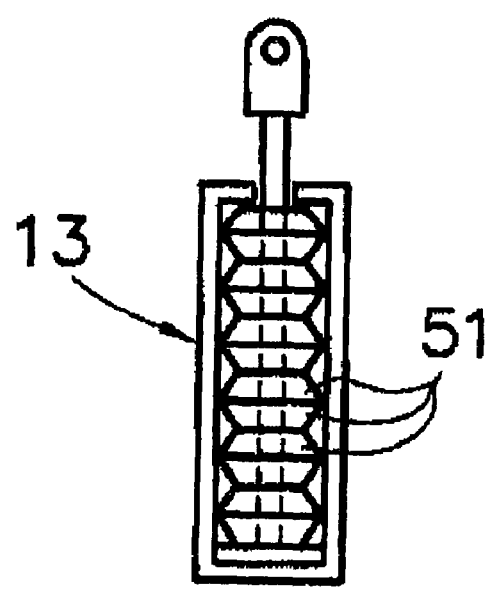

Adjustment mode of the spring constant and/or expansion/contraction stroke of the characteristic-frequency adjusting spring 13 may be, for example, of a type as shown in FIG. 17a in which a plurality of holes 17a are vertically lined on the upper holder 17 for the spring 13; and a rod 20 fixed to the damping body 3 has a tip end to which, in lieu of the eye portion 20a, a bolt hole 20b is provided for screwing or insertion of a bolt 49 or fixing pin thereinto through a selected one of the holes 17a; alternatively, in use of the bolt 49, the holes 17a as shown in FIG. 17a may be replaced by a vertical slit 17b on the upper holder 17 as shown in FIG. 17b; and any other modes may be applied. The spring 13 in the above-mentioned embodiments is not restricted to a so-called helical extension spring; for example, as shown in FIGS. 18a and 18b, a spring-loaded cylinder structure may be employed which may accommodate a helical compression spring 50 or laminated coned disc spring 51. Moreover, an attenuator used may be not only of hydraulic or mechanical type but also any type such as electric type or gas type and may be arranged at any position. Furthermore, in the embodiment shown in FIGS. 8a and 8b or shown in FIGS. 14 and 15, the attenuator 31 may be omitted and instead, the motor 30 may be that serving both for attenuation and generation of driving force.

Next, an embodiment for a method for setting a characteristic frequency of a damping body in a damping device will be described.

Figure 19:
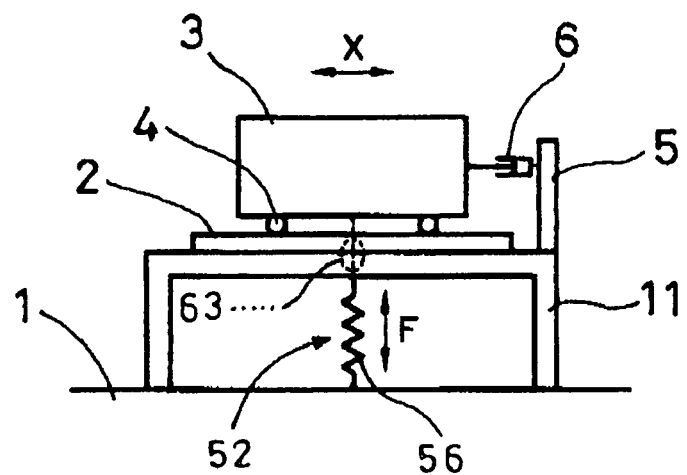
FIG. 19 is a schematic view showing an embodiment for setting a characteristic frequency of a damping body in a damping device according to the invention.

FIG. 19 shows an embodiment of the invention in which a base stand 11 in the form of a rectangular frame is installed on a top surface of the structure 1. Arranged on laterally opposite sides of forward and backward ends of the base stand 11 and along a lateral direction or direction of oscillation (direction of arrow X) of the structure 1 are guide rails 2 in parallel with each other against which a damping body or weight 3 laterally movably rests via wheels 4. An attenuator 6 is interposed between an edge face of the damping body 3 and a support frame 5 erected on the base stand 11 on a lateral side and centrally in the longitudinal direction thereof. In such damping device, a characteristic-frequency adjusting resilient structural body 52 is vertically mounted between, for example, a lower central surface of the damping body 3 in its neutral position, i.e., at a longitudinally intermediate position of the guide rails 2 and the structure 1 just therebelow for vertical tensioning and for prevention of interference with the base stand 11 and guide rails 2; an initial tension F of the resilient structural body 52 is adjusted to set the characteristic frequency of the damping body 3.

Figure 20:
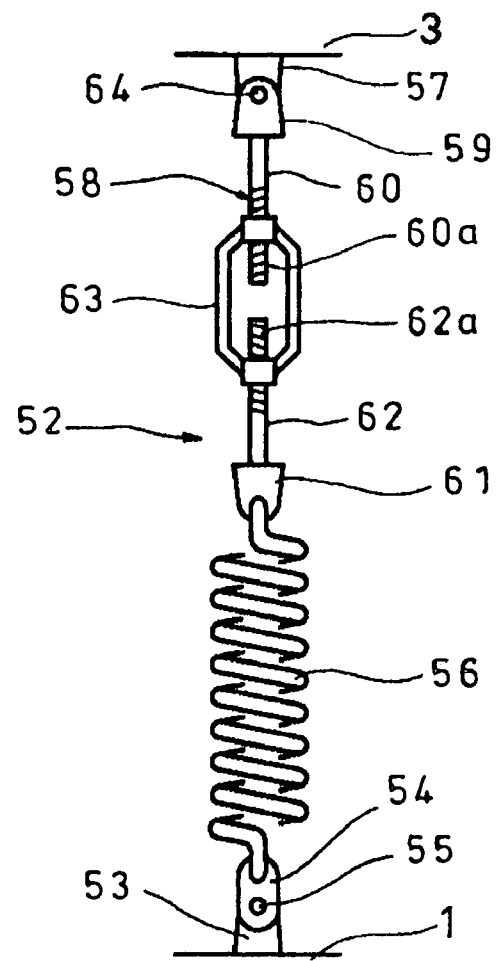
FIG. 20 is a schematic view showing an embodiment of a resilient structural body used in execution of the invention.

The resilient structural body 52 comprises, as shown in FIG. 20 in an enlarged manner, a vertically arranged helical extension spring 56 with a lower end engaged with an upper end of a link member 54 whose lower end is pivoted for lateral motion via a pin 55 to a bracket 53 secured to the structure 1, and a turnbuckled connecting rod 58 which connects an upper end of the helical extension spring 56 to a bracket 57 secured to a lower surface of the damping body 3. The turnbuckled connecting rod 58 comprises a rod 60 with an upper eye plate 59 and a lower threaded portion 60a, a rod 62 with a lower eye plate 61 and an upper portion 62a threaded opposite to the threaded portion 60a and a turnbuckle 63 to which the threaded portions 60a and 62a are screwed. The lower eye plate 61 of the rod 62 is engaged with the upper end of the helical extension spring 56 and the upper eye plate 59 of the rod 60 is pivoted for lateral reciprocation via a pin 64 to the bracket 57 on the lower surface of the damping body 3. Rotation of the turnbuckle 63 can change the length of the connecting rod 58, which in turn changes the deflection of the helical extension spring 56 as tension reaction-force.

When the characteristic frequency of the damping body 3 is to be set to be matched with the characteristic frequency of the structure 1, the turnbuckle 63 of the connecting rod 58 in the resilient structural body 52 is rotated to change the length of the connecting rod 58, whereby the initial tension F of the resilient structural body 52 as a whole on the basis of the deflection of the helical extension spring 56 is adjusted to set the characteristic frequency of the damping body 3.

In the state mentioned above, when oscillation of the structure 1 occurs due to, for example, aerodynamic force, its oscillation energy is transmitted to the damping body 3 and is converted into kinetic energy with which the damping body 3 is horizontally moved; the energy is consumed by the attenuator 6. By such kind of indirect energy consumption, the oscillation of the structure 1 is promptly suppressed. In this case, the damping force to the structure 1 is obtained optimum by selecting mass, movement stroke and/or characteristic frequency of the damping body 3. Since the characteristic-frequency adjusting resilient structural body 52 is vertically mounted between the damping body 3 and the structure 1, lateral movement of the damping body 3 causes the resilient structural body 52 to expand laterally obliquely about the pin 55 at the lower end thereof to apply horizontal components to the damping body 3 when it restores to its original state. Thus, the helical extension spring 56 has a little amount of deflection or expansion in comparison with the horizontal expansion/contraction of the spring 7 shown in FIG. 1 and does not restrict the motion of the damping body 3. Moreover, the initial tension F of the vertical resilient structural body 52 may be arbitrarily set. As a result, the characteristic frequency of the damping body 3 can be readily set to be matched with the characteristic frequency of the structure 1.

The helical extension spring 56 may be used which has a length allowing for a required variation in length since the tension of the spring does not change even if the spring is expanded obliquely from its vertical position.

Figure 21:
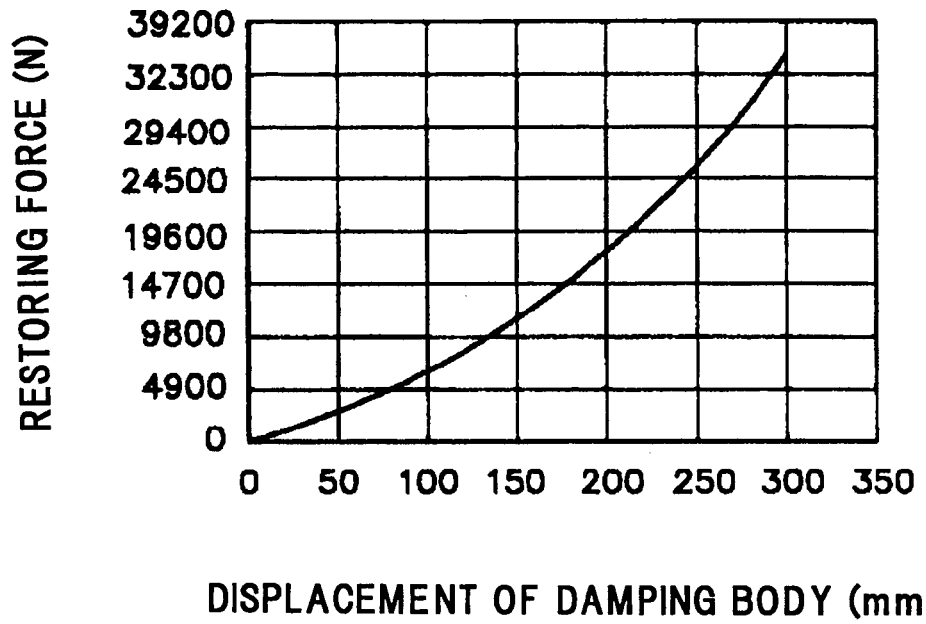
FIG. 21 is a diagram showing a relationship between displacement of the damping body and restoring force on the damping body shown in FIGS. 19 and 20.
Figure 22:
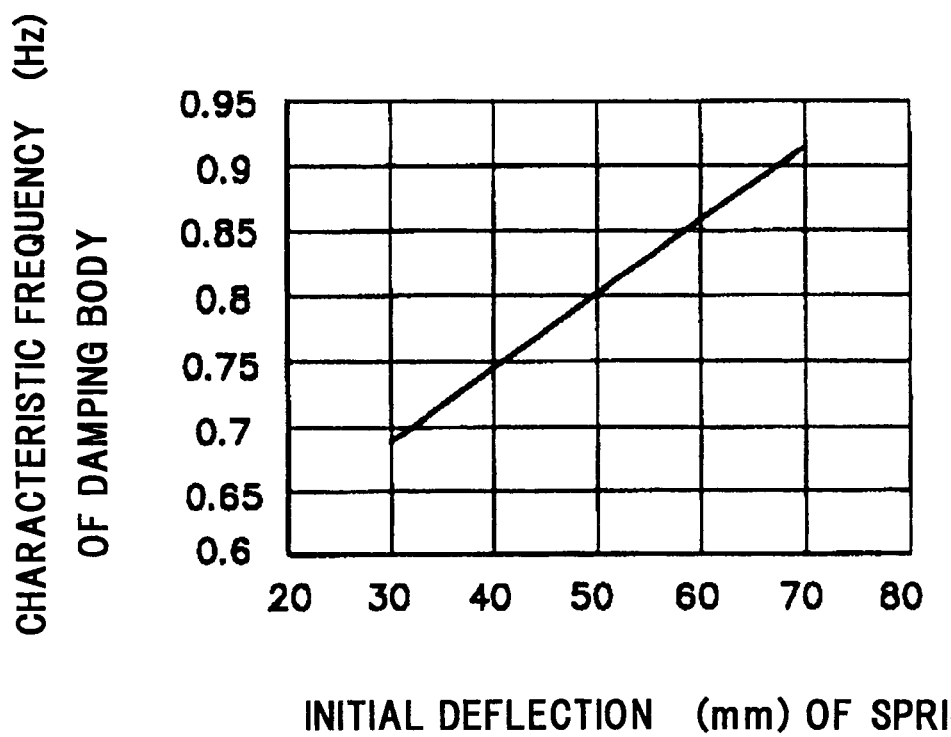
FIG. 22 is a diagram showing a relationship between deflection of a helical extension spring and the characteristic frequency of the damping body shown in FIGS. 19 and 20.

In the above, a relationship between the displacement of the damping body 3 and the restoring force acting on the damping body 3 is as exemplarily shown in FIG. 21 when, for example, the helical extension spring 56 has a free length of 600 mm, the spring constant is 755 N/mm and mass of the damping body 3 is 3000 kg. A relationship between initial deflection of the helical extension spring 56 and the characteristic frequency of the damping body 3 is as exemplarily shown in FIG. 22. It is known from FIG. 22 that changing the deflection of the helical extension spring 56 in a range of 30-70 mm can steplessly adjust the characteristic frequency of the damping body 3 substantially in a range of 0.7-0.9 Hz. Therefore, the characteristic frequency of the damping body 3 can be set optimum to be matched with the characteristic frequency of the structure 1; even when the characteristic frequency of the damping body 3 is to be re-adjusted in accordance with change in characteristic frequency of the structure 1, there is no need of replacement, in every occasion, into a spring with different spring constant unlike the conventional cases.

Figure 23:
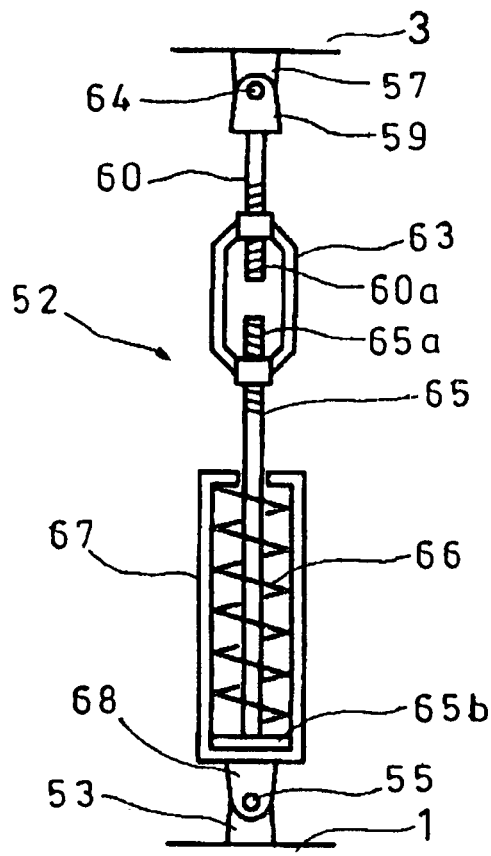
FIG. 23 is a schematic view showing a further embodiment of the resilient structural body.

FIG. 23 shows a further embodiment of the resilient structural body 52 used in the invention in which a piston rod 65 and a helical compression spring 66 are substituted for the rod 62 and the helical extension spring 56 shown in FIG. 20. More specifically, the piston rod 65 is protruded/withdrawn through one of longitudinal end walls of a cylinder barrel 67 which accommodates a piston 65b. The helical compression spring 66 is arranged within the cylinder barrel 67 between said longitudinal end wall and said piston 65b. An upper end of the piston rod 65 extending from the cylinder barrel 67 is formed with a threaded portion 65a. In the same manner as shown in FIG. 20, a turnbuckle 63 is arranged between said threaded portion and a lower threaded portion 60a of a rod 60. Fixed to the other longitudinal or lower end wall of the cylinder barrel 67 is an eye plate 68 which is pivoted for lateral movement via the pin 55 to the bracket 53 on the structure 1. The remaining structural features are the same as those shown in FIG. 20; the parts same as those in the figure are designated by the same reference numerals.

Even in use of the resilient structural body 52 shown in FIG. 23, the characteristic frequency of the damping body 3 can be readily set and adjusted by adjusting the initial tension of the helical compression spring 66 based on its contraction reaction force through rotational operation of the turnbuckle 63.

Figure 24:
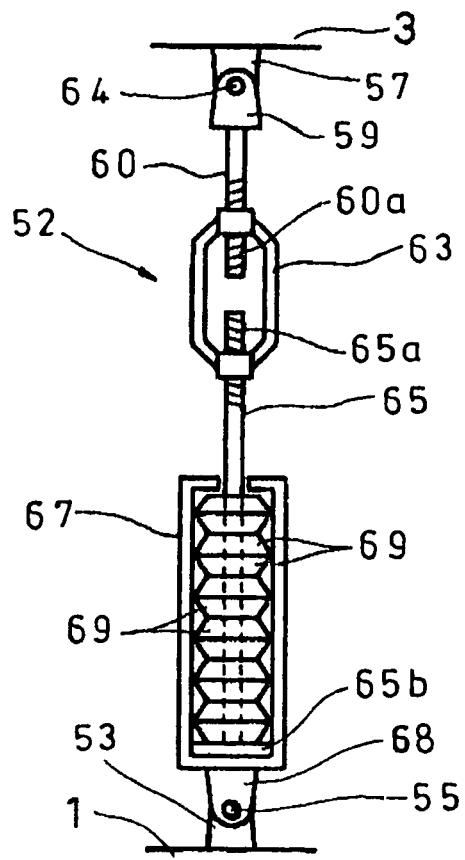
FIG. 24 is a schematic view showing a still further embodiment of the resilient structural body.

FIG. 24 shows a still further embodiment of the resilient structural body 52 used in the invention in which a coned disc spring 69 is substituted for the helical compression spring 66 shown in FIG. 23. The remaining structural features are the same as those shown in FIG. 23; the parts same as those in the figure are designated by the same reference numerals.

Even in use of the resilient structural body 52 shown in FIG. 24, the characteristic frequency of the damping body 3 can be readily set and adjusted by adjusting initial tension of the coned disc spring 69 based on its contraction reaction force through rotational operation of the turnbuckle 63.

Figure 25:
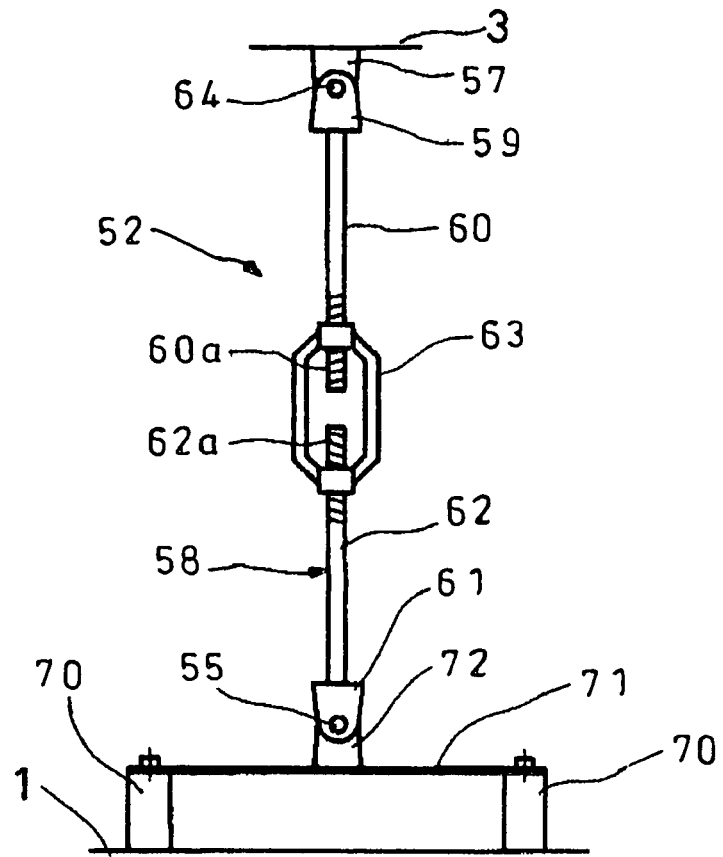
FIG. 25 is a schematic view showing a still further embodiment of the resilient structural body.

FIG. 25 shows a further embodiment of the resilient structural body 52 used in the invention in which installed on the structure 1 in a laterally spaced-apart relationship are supports 70 on and by which in turn a leaf spring 71 is horizontally arranged and carried to be secured to the supports 70. A connecting rod 58 constructed in the same manner as that shown in FIG. 20 is vertically arranged between a center of the leaf spring 71 and a lower surface of a damping body 3. An upper eye plate 59 of the connecting rod 58 is pivoted via a pin 64 to a bracket 57 on the damping body 3. A lower eye plate 61 of the connecting rod 58 is pivoted via a pin 55 to a bracket 72 fixed to the leaf spring 71.

In the case of the resilient structural body 52 constructed as shown in FIG. 25, rotation of the turnbuckle 63 changes the length of the connecting rod 58 so that the leaf spring 71 is elastically deformed and its elastic reaction force is imposed as initial tension. Thus, by adjusting this initial tension, the characteristic frequency of the damping body 3 can be readily set and adjusted.

Figure 26:
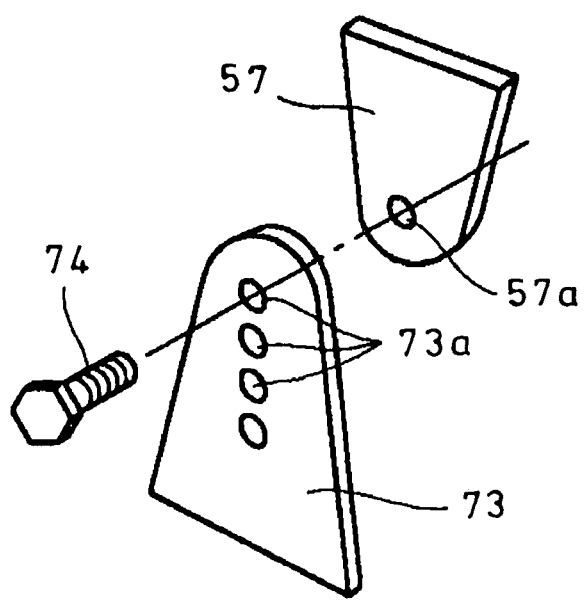
FIG. 26 is a schematic view showing a further embodiment of an initial tension adjustment portion of the resilient structural body.

FIG. 26 shows a further embodiment of an initial tension adjustment portion in the form of the resilient structural body 52 in which the connecting rod 58 shown in FIG. 20 or 25 is modified into a single rod structure with no turnbuckle 63, the upper eye plate 59 of the connecting rod 58 being replaced by a support plate 73 with a plurality of vertically lined holes 73a. Any one of the holes 73a of the support plate 73 is aligned with the hole 57a of the bracket 57 for connection by a bolt 74 and nut; by changing this connected position, the initial tension can be adjusted. The structure shown in FIG. 26 may be adopted as an upper end of the piston rod 65 in place of the rod 60 and the turnbuckle 63 shown in FIGS. 23 and 24. The above-mentioned holes 73a may be replaced by a slit.

Adjustment of the initial tension of the resilient structure 52 by the adjustment portions as shown in FIG. 26 may also set and adjust the characteristic frequency of the damping body 3. The initial tension of the resilient structural body 52 may be also adjusted by the portions shown in FIG. 17a or 17b.

Figure 27:
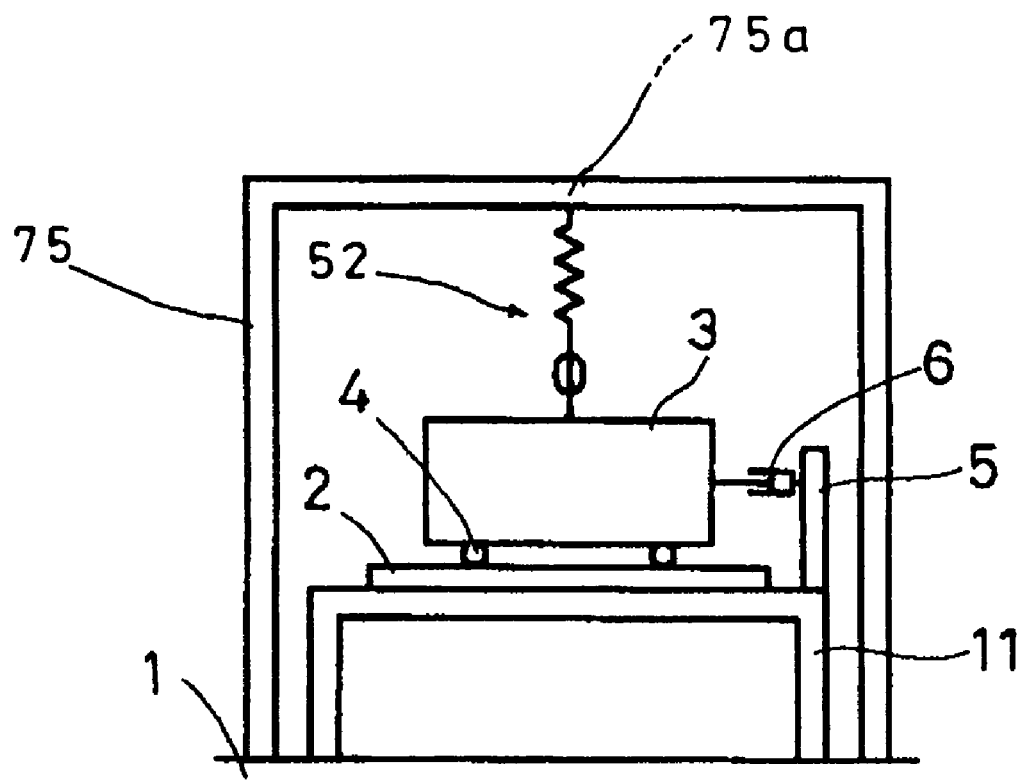
FIG. 27 is a schematic diagram showing a modification of the invention.

The resilient structural body 52 shown in any of the embodiments may be arranged upside down. Moreover, in place of the resilient structural body 52 shown in FIG. 19 and arranged between the lower central surface of the damping body 3 and the top of the structure 1, a support housing 75 as shown in FIG. 27 is arranged as a stationary member to surround the base stand 11 and the damping body 3; the resilient structural body 52 is vertically mounted between, for example, a top center of the damping body 3 and an upper beam 75a of the support housing 75 as if the damping body 3 were suspended from above. If allowable in view of size of the structure 1 and mass of the damping body 3, rubber may be used as resilient structural body 52. In the embodiments, application to a passive type damping device is shown; however, application to an active type damping device may be similarly performed.

INDUSTRIAL APPLICABILITY

As mentioned above, a damping device according to the invention has the following excellent effects and advantages.
(1) A damping body horizontally movably rests against a structure and a characteristic-frequency adjusting spring or springs are mounted between the damping body and the structure such that expansion/contraction force is vertically exerted. As a result, upon movement of the damping body, the spring or springs are expanded obliquely forwardly and backwardly so that, even if spring constant and/or expansion/contraction stroke of the spring or springs is changed, no movement of the damping body is substantially restricted in comparison with cases of the spring or springs being horizontally mounted; as a result, a characteristic frequency of the damping body can be readily adjusted with no mechanical restrictions on the spring or springs even in a case of the structure having a lower characteristic frequency. Moreover, since no spring or springs stretch out horizontally, the device as a whole can be manufactured compactly in size and simply in structure.

(2) A passive type damping device may be provided such that a damping body horizontally movably rests against a structure; mounted between a damping body and the structure are an attenuator for attenuating moving force of the damping body and a characteristic-frequency adjusting spring or springs for exertion of vertical expansion/contraction force.

(3) An active type damping device may be provided such that a damping body horizontally movably rests against a structure; mounted between a damping body and the structure are an actuator for reciprocation of the damping body and a characteristic-frequency adjusting spring or springs for exertion of vertical expansion/contraction force.

(4) Instead of the characteristic-frequency adjusting spring or springs for exertion of vertical expansion/contraction force mounted between the damping body and the structure, a characteristic-frequency adjusting spring or springs may be mounted between the damping body and a stationary member erected on the structure to have a position higher than that of the damping body. Such constructions may be also readily fabricated and does not restrict the movement of the damping body.

(5) An integral construction may be provided by a plurality of damping units each of which is constituted by a damping body horizontally movably resting against a base stand, an attenuator for attenuation of moving force of the damping body and a characteristic-frequency adjusting spring or springs for exertion of vertical expansion/contraction force, said attenuator and said spring or springs being mounted between the damping body and the base stand, the damping units being piled one above the other on a structure such that their corresponding damping bodies may be moved perpendicular to each other and that the upper damping unit is piled on the lower damping unit on the structure; alternatively, an integral construction may be provided by a plurality of damping units each of which is constituted by a damping body horizontally movably resting against a base stand, an actuator for reciprocation of the damping body and a characteristic-frequency adjusting spring or springs for exertion of vertical expansion/contraction force, said actuator and said spring or springs being mounted between the damping body and the base stand, the damping units being piled one above the other on a structure such that their corresponding damping bodies may be moved perpendicular to each other and that the upper damping unit is piled on the lower damping unit on the structure (see FIGS. 14 and 15). By such integral construction, oscillation of the structure can be attenuated even if the structure may oscillate horizontally in any direction.

(6) Movement of the damping body may be guided by a linear guide mechanism to lessen noises during movement of the damping body.

Moreover, a method for setting a characteristic frequency of a damping body in a damping device according to the invention has the following excellent effects and advantages.

(1) A resilient structural body or bodies are mounted between a structure and a damping body resting for horizontal reciprocation against the structure such that a vertical tension is exerted, an initial tension of the resilient structural body or bodies being adjusted to set the characteristic frequency of the damping body. Thus, unlike the conventional cases, the characteristic frequency of the damping body can be readily set and adjusted with no preparation of a number of springs for replacement and re-adjustment may be also performed with no hindrance. As a result, the characteristic frequency can be readily set at site, leading to shortening of construction period and reducing of construction cost.

(2) The or each resilient structural body may comprise a spring and a connecting rod variably adjustable in length so that the initial tension is adjusted by changing the length of the connecting rod; alternatively, the or each resilient structural body may comprise a spring and a connecting rod which is connected at its end away from the spring to a support plate which in turn is lapped over and pivotally connected to a bracket secured to the damping body or the structure so that the initial tension is adjusted by varying a connected position between the support plate and the bracket. Thus, the characteristic frequency of the damping body can be set to an optimum value matched with the characteristic frequency of the structure.

The invention claimed is:

1. A damping device comprising:
a plurality of damping units constructed integrally, each of the damping units comprising a damping body horizontally movably resting against a base stand;
an attenuator supported on the base stand for attenuation of moving force of the damping body; and
a characteristic-frequency adjusting spring or springs through which said damping body is connected to said base stand for exertion of vertical expansion/contraction force,
said attenuator and said spring or springs being mounted between the damping body and the base stand,
the damping units being piled one above the other on a structure such that the corresponding damping bodies thereof may be moved perpendicular to each other and that the upper damping unit is piled on the lower damping unit on the structure,
wherein movement of the upper and lower damping bodies is guided by linear guide mechanisms for the upper and lower damping bodies, respectively.

2. A damping device comprising:
a plurality of damping units constructed integrally, each of the damping units comprising a damping body horizontally movably resting against a base stand;
an actuator supported on the base stand for reciprocation of the damping body; and
a characteristic-frequency adjusting spring or springs through which said actuator is connected to said base stand for exertion of vertical expansion/contraction force,
said actuator and said spring or springs being mounted between the damping body and the base stand,
the damping units being piled one above the other on a structure such that the corresponding damping bodies thereof may be moved perpendicular to each other and that the upper damping unit is piled on the lower damping unit on the structure,
wherein the upper damping unit is adapted as the damping body for the lower damping unit, and
movement of the upper and lower damping bodies is guided by linear guide mechanisms for the upper and lower damping bodies, respectively.

* * * * *